US012238104B2

(12) United States Patent
Hillis et al.

(10) Patent No.: US 12,238,104 B2
(45) Date of Patent: *Feb. 25, 2025

(54) SECURE COMMUNICATION SYSTEM

(71) Applicant: Applied Invention, LLC, Burbank, CA (US)

(72) Inventors: W. Daniel Hillis, Rindge, NH (US); David C. Douglas, Concord, MA (US); Mathias Kolehmainen, Louisville, KY (US); Steven Willis, Cambridge, MA (US); Frank Kastenholz, Medford, MA (US); Michael Dubno, New York, NY (US)

(73) Assignee: APPLIED INVENTION, LLC, Burbank, CA (US)

( * ) Notice: Subject to any disclaimer, the term of this patent is extended or adjusted under 35 U.S.C. 154(b) by 164 days.

This patent is subject to a terminal disclaimer.

(21) Appl. No.: 17/814,492

(22) Filed: Jul. 22, 2022

(65) Prior Publication Data
US 2022/0368688 A1    Nov. 17, 2022

Related U.S. Application Data

(63) Continuation-in-part of application No. 17/658,056, filed on Apr. 5, 2022, which is a continuation of (Continued)

(51) Int. Cl.
*H04L 9/40*    (2022.01)
*H04L 9/32*    (2006.01)

(52) U.S. Cl.
CPC ............ *H04L 63/10* (2013.01); *H04L 9/3268* (2013.01); *H04L 9/3271* (2013.01); (Continued)

(58) Field of Classification Search
CPC . H04L 9/32–3213; H04L 9/3226–3234; H04L 9/68; H04L 47/0894; H04L 47/10; (Continued)

(56) References Cited

U.S. PATENT DOCUMENTS 7,962,750 B1   6/2011  Gruse et al.
8,495,721 B1   7/2013  Moody et al.
(Continued)

*Primary Examiner* — Kevin Bechtel
(74) *Attorney, Agent, or Firm* — Perkins Coie LLP; Michael Glenn

(57) ABSTRACT

A secure communication system enabling secure transport of information is disclosed. The system comprises a secure network with one or more packet processing units connected by links through an internal communication system. The secure network transports packets of information between credentialed and authenticated agents. Each packet is associated with a visa issued by a visa service. The visa specifies the procedures governing the processing of the packet by the packet processing units as it is transported along a compliant flow, between agents thorough the network, according to a set of policies specified in a network configuration. Packet processing units include docks and forwarders. Adaptors serving the agents communicate with the network through tie-ins to docks. The system also includes and admin service, accessible to one more admins, that facilitates configuration and management of the network.

20 Claims, 15 Drawing Sheets

Related U.S. Application Data application No. 17/098,824, filed on Nov. 16, 2020, now Pat. No. 11,799,844, and a continuation of application No. 17/091,944, filed on Nov. 6, 2020, now Pat. No. 11,856,027, which is a continuation-in-part of application No. 16/019,423, filed on Jun. 26, 2018, now Pat. No. 10,868,806, and a continuation-in-part of application No. 16/019,412, filed on Jun. 26, 2018, now Pat. No. 11,102,194, said application No. 17/098,824 is a continuation of application No. 16/019,423, filed on Jun. 26, 2018, now Pat. No. 10,868,806.

(60) Provisional application No. 63/057,875, filed on Jul. 28, 2020, provisional application No. 62/551,685, filed on Aug. 29, 2017, provisional application No. 62/539,220, filed on Jul. 31, 2017, provisional application No. 62/525,623, filed on Jun. 27, 2017.

(52) U.S. Cl.
CPC ........ *H04L 63/0227* (2013.01); *H04L 63/062* (2013.01); *H04L 63/083* (2013.01); *H04L 63/0884* (2013.01); *H04L 63/1441* (2013.01); *H04L 9/3234* (2013.01); *H04L 63/0861* (2013.01); *H04L 63/101* (2013.01)

(58) Field of Classification Search
CPC ..... H04L 47/20; H04L 47/70; H04L 63/0227; H04L 63/08–0807; H04L 63/0884; H04L 63/10–105; H04L 63/108; H04L 63/14; H04L 63/1408; H04L 63/1441; H04L 63/20

See application file for complete search history.

(56) References Cited

U.S. PATENT DOCUMENTS

| | | |
|---|---|---|
| 9,215,075 B1 | 12/2015 | Poltorak |
| 2007/0250713 A1 | 10/2007 | Rahman et al. |
| 2014/0109175 A1 | 4/2014 | Barton et al. |
| 2014/0115668 A1 | 4/2014 | Stuntebeck et al. |
| 2014/0188738 A1 | 7/2014 | Huxham |
| 2015/0086020 A1 | 3/2015 | Harjula et al. |
| 2015/0200928 A1 | 7/2015 | Burch et al. |
| 2015/0254677 A1 | 9/2015 | Huxham et al. |
| 2015/0295911 A1* | 10/2015 | Sumioka ............ H04L 63/0807 726/4 |
| 2015/0372875 A1 | 12/2015 | Turon et al. |
| 2016/0248682 A1 | 8/2016 | Lee et al. |
| 2016/0330220 A1 | 11/2016 | Dulkin et al. |
| 2016/0330222 A1 | 11/2016 | Brandt et al. |
| 2016/0359915 A1 | 12/2016 | Gupta et al. |
| 2017/0163606 A1 | 6/2017 | Yin |
| 2017/0279805 A1 | 9/2017 | Diaz-Cuellar et al. |
| 2017/0324652 A1 | 11/2017 | Lee et al. |
| 2018/0109554 A1 | 4/2018 | Reddy et al. |
| 2018/0302479 A1* | 10/2018 | Kolbe ................... H04L 67/56 |
| 2018/0375850 A1 | 12/2018 | Hillis |
| 2018/0375866 A1 | 12/2018 | Hillis et al. |
| 2021/0058369 A1 | 2/2021 | Hillis et al. |
| 2022/0368688 A1 | 11/2022 | Hillis et al. |
| 2023/0171228 A1 | 6/2023 | Hillis et al. |

\* cited by examiner

SECURE COMMUNICATION SYSTEM

CROSS REFERENCE TO RELATED APPLICATIONS

This application is a continuation-in-part of U.S. patent application Ser. No. 17/658,056, filed Apr. 5, 2022, which is a continuation of U.S. patent application Ser. No. 17/098,824, filed Nov. 16, 2020, which is a continuation of U.S. patent application Ser. No. 16/019,423 (U.S. Pat. No. 10,868,806), filed Jun. 26, 2018, which claims priority from U.S. provisional patent application Ser. No. 62/525,623, filed Jun. 27, 2017, Ser. No. 62/539,220, filed Jul. 31, 2017, and Ser. No. 62/551,685, filed Aug. 29, 2017; and is a continuation of U.S. patent application Ser. No. 17/091,944, filed Nov. 6, 2020, which claims priority from U.S. provisional patent application Ser. No. 63/057,875, filed Jul. 28, 2020, and is a continuation-in-part of U.S. patent application Ser. No. 16/019,412 (U.S. Pat. No. 11,102,194), filed Jun. 26, 2018 and U.S. patent application Ser. No. 16/019,423 (U.S. Pat. No. 10,868,806), filed Jun. 26, 2018, each of which claims priority from U.S. provisional patent applicationsSer. No. 62/525,623, filed Jun. 27, 2017, Ser. No. 62/539,220, filed Jul. 31, 2017, and Ser. No. 62/551,685, filed Aug. 29, 2017, each of which application is incorporated herein in its entirety by this reference thereto.

BACKGROUND OF THE INVENTION

Technical Field

The present disclosure pertains to the field of communication and, in particular, secure communication networks.

Background

Most existing network protocols were not originally designed with the expectation that malicious actors would have access to the network. For example, on the Internet, the general philosophy is to allow all connected users and devices to communicate. As explained in the Internet Engineering Task Force's 1996 Architectural Principles of the Internet, "confidentiality and authentication are the responsibility of end users and must be implemented in the protocols used by the end users". Because of this lack of authentication, it is often impossible to know who originated a packet received via the Internet.

For this and other reasons, even using state-of-the-art best practices, protecting the online resources of an organization is extremely difficult to do perfectly. A single security weakness can cause catastrophic data losses, thefts, and shut down of critical functions. Denial of service attacks, insider attacks, and malware are especially difficult for organizations that support heterogonous software environments or multiple clouds and for organizations where users are a mix of employees, contractors, and vendors accessing the services from locations physically outside of company properties. Most organizations rely on properly configured firewalls and VPNs to protect against outside attacks.

However, it is difficult to configure the firewalls in a way that enables legitimate communication outside the enclave without opening holes that can be exploited by attacks. And even if the firewall operates perfectly, the protected enclave remains vulnerable to attack from within—by an insider or by a rogue software entity such as a computer virus that penetrates the enclave, for example through an email attachment or USB drive. Most large organizations accept that network security breaches are likely and use monitoring and auditing tools to catch them and stop them as quickly as possible when they inevitably occur.

Figure 1:
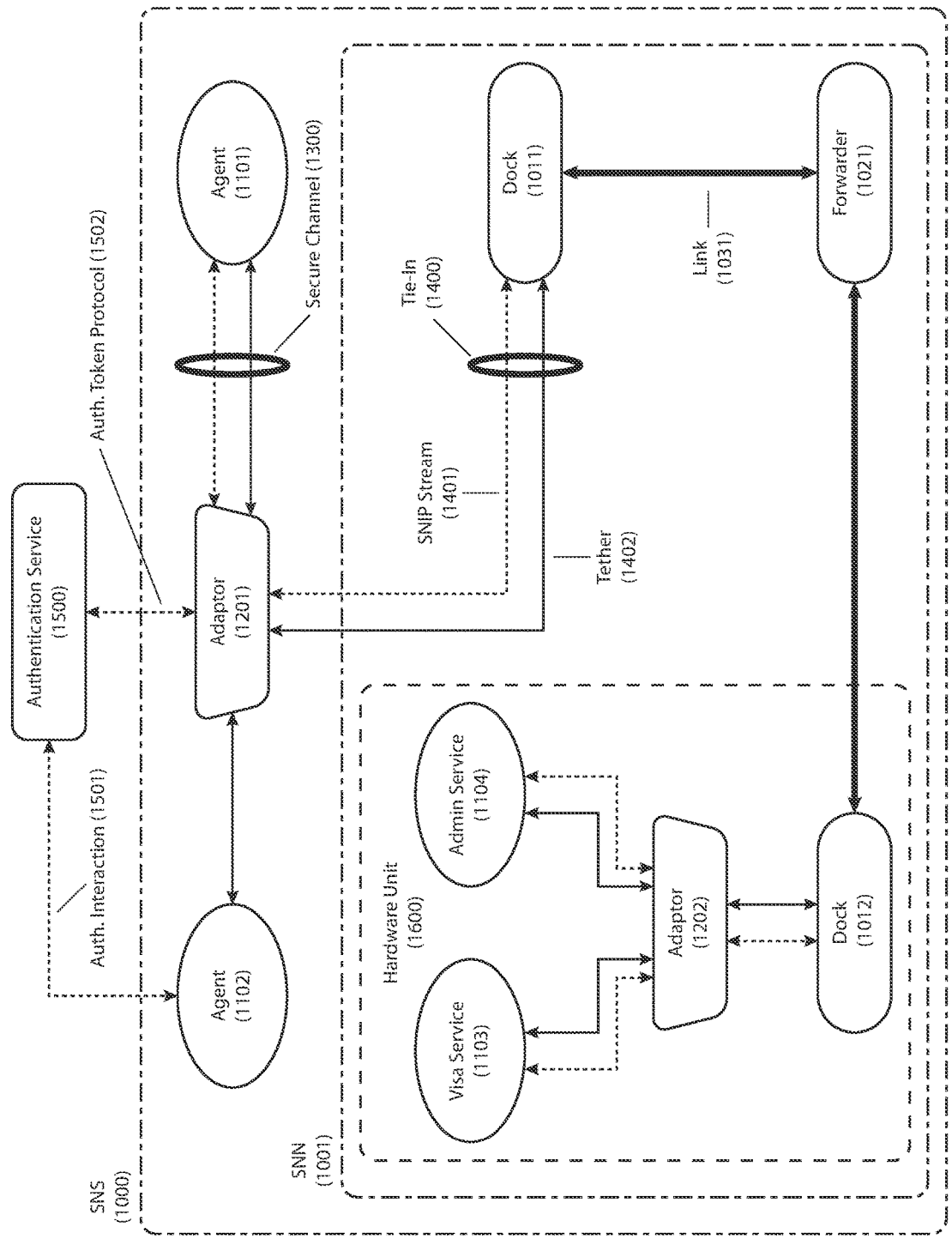
FIG. 1 shows an exemplary SNS in which two agents authenticate and connect to a minimal SNN with a visa service and admin service on a single hardware unit, in accordance with an embodiment of the present disclosure.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

System Overview

The disclosed invention is a secure communication system, called the selective network system (SNS), based on a secure network, called the selective node network (SNN). The SNS consists of the SNN, agents, adaptors, a method of agent-adaptor communication for each agent, and a method of adaptor-SNN communication for each adaptor. Agents may be, for example, people, devices, software services, networks, or combinations of these, such as a person using a device. One or more of the agents serve as admins of the SNS that determine the configuration of the SNN, including the policies enforced by the SNN. Agents connect to the SNN via adaptors that facilitate the authentication of the agents by the SNN and transmit and receive the agent's communications through the SNN. Each of the agents has an identity and access to a set of credentials that can be used to authenticate attributes of that identity.

The purpose of a SNS is to allow authenticated agents to communicate with one another securely, if and only if they are allowed to do so by the policies. The policies are automatically enforced by the SNN. Policies are enforced on communication between agents throughout the SNN, not just at the edges of the SNN, and all communication through the SNN is disallowed unless it is explicitly allowed by the policies. Some adaptors are used for internal communication with SNN services within the SNN, but no other adaptor is a part of the SNN nor is it required to be under the control of the admins. The SNN does not rely upon adaptors to enforce the policies. The policies may reference the identity of the agents; the authentication of attributes of the agent's identity; the time, the location, the bandwidth and volume of a communication; the port numbers and packet protocols used for a communication; trust evaluations provided by a trust evaluation service; and the availability of specific pools of resources within the SNN.

A SNS makes use of secure channels, which transmit information between two endpoints in a manner resistant to eavesdropping and tampering. A secure channel may be implemented by a protected, hardwired, electrical or optical connection; by an internal hardware connection such as a data bus, register, or shared memory; or by a secure communications session established through a network. A secure channel may also be reliable, in the sense that it is protected against internal loss or corruption of the transmitted information. A reliable, secure channel is either implemented on an internal hardware connection within a hardware unit or through a connection between hardware units that can detect and retransmit lost or corrupted information.

Methods for establishing secure channels are familiar in the art. A SNS utilizes some of these methods, but it also uses a novel method to establish a secure channel between adaptors called a compliant flow. The SNN within the SNS automatically establishes a compliant flow to transmit packets between adaptors by associating each packet of the compliant flow with a certificate called a visa that may be valid during the time the packet transits the network. The visa associated with a packet, referred to as the packet's visa, specifies the procedures that govern the processing of the packet and enforce policies on compliant flows each time the packet is transmitted. This allows the enforcement of policies to reflect changing conditions and changing policy. This contrasts with conventional network sessions, where policy is typically enforced only at the time a new session is established.

Agents communicate with the SNN through reliable, secure channels called tie-ins. Each agent communicates with the SNN through an adaptor that associates the agent's communications with an authenticated identity. Allowed communication packets travel from a source agent to its adaptor; through a tie-in to the SNN, where policies specified by the associated visa are enforced each time the packet is transmitted within the SNN; back through a tie-in to an adaptor; and finally, to a destination agent. The adaptor may also communicate with the SNN through a tie-in to assist in authenticating the identity of an agent that communicates through it. An adaptor communicating through a tie-in demonstrates it has access to the secure channel embodied by the tie-in each time it sends an agent packet. The adaptor also demonstrates that it has access to this secure channel each time it facilitates authentication of an identity attribute. Thus, the SNN can determine that agent packets are sent by an entity with access to the same secure channel that was used to facilitate the authentication of the identity attributes.

Tie-ins use the method of adaptor-SNN communication. When that method is not itself a reliable, secure channel, a reliable, secure session is established using that method in conjunction with other methods known in the art for establishing and maintaining reliable, secure channels. In the preferred embodiment of the invention, the method of adaptor-SNN communication is a standard IP network, and the preferred method for establishing and maintaining reliable, secure channels is the QUIC protocol.

The policies enforced by the SNN are set by admins, which are agents that have access to a special set of tools, SNN services, and credentials that allow them to administer the SNN through the SNN. The admins describe policies in a policy specification that is expressed in a formal policy description language. The policy specification defines multiple categories of policy that govern the activity of a SNS, including communication policies, authentication policies, connection policies, and reporting policies. Communication policies define which agents can communicate and under what circumstances and what resources they are allocated to do so. Authentication policies define how and when agents may authenticate their identities. Connection policies define how the SNN establishes and maintains internal links and tie-ins. Reporting policies define how and when information such as network events are directly reported or logged. Any of these policies may depend on a trust evaluation service that evaluates trust in agents and other system components.

A SNS may make use of services that are not part of the SNN, such as a domain name service (DNS) and the trust evaluation service. These services may communicate through the SNN as agents.

SNN Overview

A SNN consists of a set of packet processing units (PPUs), a visa service, an admin service, management services, and an internal communication system that allows the services to communicate with the PPUs and the PPUs to communicate with one another. Some PPUs, called docks, can establish tie-ins with adaptors that allow agents to communicate through and within the SNN. Some docks are gateways to the SNN, and other docks are internal docks that allow internal services to communicate through the SNN as agents. The internal services each have an internal adaptor and can communicate with an internal dock. Every dock can communicate with its connected adaptors. Other PPUs, called forwarders, connect only to other PPUs. Each PPU has an associated PPU number which may depend on the configuration of the network.

A PPU is a device or component of a device that serves a specific role in processing packets as a node of the SNN. A PPU can be physical or virtual and either is a complete hardware unit or has an associated hardware unit that contains it. Multiple PPUs may be contained on a single hardware unit. The visa service and admin service have one or more associated hardware units that implement their functions. A hardware unit may also implement a management service. The hardware units that implement these services may contain PPUs. Each hardware unit includes a clock to keep track of the time. Part of the internal communication system may be implemented within hardware units, and part of it may be implemented by an internal network, such as a wired or wireless IP network, or by other connections between hardware units. Hardware units may be specialized devices, packet-processing routers, or general-purpose computers, optionally augmented with specialized PPU components and other specialized packet switching hardware.

The function of a SNN is to allow the establishment of tie-ins to docks, to enable the determination and authentication of the identity of agents communicating through tie-ins, to transport packets securely between those tie-ins when allowed by the policies, and to block the transport of all other packets. The PPUs communicate among themselves through the internal communication system over secure communication channels called links Each PPU is connected through links to all other PPUs, either directly or through other PPUs. Each dock is connected directly by a link to one forwarder. Thus, every SNN includes a dock, a forwarder, and a link between them.

A dock receives an agent packet from an adaptor through a tie-in, converts it to an internal packet that is associated with a visa, and transmits the internal packet to a forwarder. In the preferred embodiment, agent packets are either IPv4 or IPv6 packets. A forwarder either transmits a packet to another PPU or discards it. Both docks and forwarders enforce policies.

Each internal packet is associated with a visa that specifies what procedures should be applied when a PPU processes the packet, ensuring that the communication policies are enforced and that the packet is transmitted to the appropriate destinations. A packet is discarded unless these procedures indicate that it should be transmitted.

The admin service manages configurations of the SNN, manages other SNN services, manages SNN services' associated adaptors, receives reporting from the SNN and other SNN services and associated adaptors, and keeps clocks on all hardware units synchronized within policy-determined tolerances. The admin service is connected by a reliable, secure channel to each management service, to each PPU, and to at least one admin. The admins use trusted tools to compile the policy specifications into the format required by the admin service. They are communicated to the admin service using the Selective Network Administrative Protocol (SNAP).

The admin service may require some form of authentication from the admins to connect to the admin service and perform admin service operations through SNAP. In addition to this admin service authentication, the SNN itself can enforce policies to limit communication with the admin service. To facilitate the application of different policies to different operations, the admin service may use different addresses for different operations. The network can then enforce different policies to control access to these different types of operations.

The visa service issues visas upon request from a dock and may issue visas before activation of a configuration. The visa service is connected by a reliable, secure channel to each dock. The visa service is preferably implemented in a distributed manner across multiple hardware units.

In the preferred embodiment of the invention, the admin service, the visa service, and the management services are internal agents within the SNN, and PPUs use pre-issued visas to establish secure channels to them through the SNN. A reliable, secure channel is then established through that secure channel by methods known in the art, such as the TCP protocol, and the admin service keeps clocks on all hardware units synchronized using the Network Time Protocol. Each hardware unit's management service establishes reliable, secure channels to the admin service and visa service. The management service uses these channels in conjunction with a communication mechanism internal to the hardware unit to establish reliable, secure channels between the services and the PPUs implemented on the hardware unit.

To maintain control of the programming of the SNN, the admins can control the initial state of all hardware units that implement the SNN. This includes the initial run-time state, the state of any programmable memory, the firmware, the initial software, and other programming. In this initial state, the hardware units can establish an initial reliable, secure connection to the admin service either internally or though the SNN, and the admins can establish an initial reliable, secure startup channel to the admin service. Communications between an admin and the admin service always use SNAP. Once these connections are established, an admin can communicate with the admin service to define and activate an initial configuration that includes the hardware unit and SNN components it implements, after which the startup channel may be disabled.

Agents and Identities

Agents are the entities that policies allow to communicate via the SNN. These permissioned agents may be people, devices, services, and combinations of these, such as the combination of a service and the specific hardware device that it runs on, or a person and a specific type of hardware device. The core function of a SNS is to enable agents to communicate when allowed to do so by policies. Each agent has at least one associated agent address, which is preferably an IP address, which it uses for communication through the SNS. An agent may also correspond to a network that delivers packets in a certain address range. That network may be a conventional IP network, or it may be another SNN with policies of its own.

The identity of an agent is a set of attribute/value pairs. Attributes of an identity may include information such as the location of the agent and the devices through which the agent is communicating with the SNN. For example, one of the attributes of an agent that is the combination of a person and a computer may be TYPE, with value EMPLOYEE-USING-MANAGED-LAPTOP. Other attributes of this agent may include EMPLOYEE-ID and LAPTOP-SERIAL-NUMBER. In the case of an agent that is a server, for example a web server, one of the attributes may be URL, with a value that is the Uniform Resource Locator of the server.

The authentication policies of the SNS determine when attributes of the identity of an agent need to be authenticated and how they may be authenticated. Depending on the attributes within the identity, the agent may be expected to demonstrate, via the adaptor, access to credentials that can authenticate the claimed combination of attributes. Alternatively, a trusted authentication service, which is not necessarily part of the SNS, may be asked to authenticate attributes of the agent's identity and provide, for example, a cryptographically signed certificate certifying that the attributes have been authenticated in association with other attributes of the identity.

In the example above, the policies for authenticating LAPTOP-SERIAL-NUMBER may require authentication through the device's Trusted Platform Module (TPM) and the policies for authenticating the EMPLOYEE-ID may require a face recognition scan. The adaptor can challenge the agent through protocols that are determined by the specific interfaces between the agent and the adaptor or it may authenticate the identity with the assistance of a trusted authentication service.

An agent, such as an admin, may have attributes that require the cooperation of multiple individuals, or multiple individuals having access to specific devices, to authenticate. These can be used advantageously to ensure that a single individual with administrative privileges cannot administer the SNN without the cooperation of other individuals with administrative privileges. The admin service may use different addresses for different types of operations, and policies may require different combinations of authentications to access these different types of operations.

Exemplary System Topology

The components of a SNS and the relationships between them may be better understood by way of example. FIG. 1 shows an exemplary SNS in which two agents authenticate and connect to a minimal SNN with a visa service and admin service on a single hardware unit, in accordance with an embodiment of the present disclosure. In FIG. 1, dashed lines represent authentication communications and solid lines represent the transmission of packets.

In the exemplary SNS 1000, a first agent 1101 connects to an adaptor 1201 through a secure channel 1300 with two streams. One stream allows the agent to authenticate directly through the adaptor; the second stream transmits agent packets between the agent and adaptor. A second agent 1102 connects to the adaptor 1201 through a secure channel with a single stream. The second agent authenticates with the adaptor via a third-party authentication service 1500. The second agent and the authentication service engage in an authentication interaction 1501 that, if successfully completed, allows the authentication service to authenticate the second agent to the adaptor via an authentication token protocol 1502.

The adaptor of the first and second agent connects to the SNN 1001 via a tie-in 1400 to a dock 1011. The tie-in includes two streams A SNIP stream 1401 (described later) allows the agent to authenticate through the adaptor; a tether 1402 (described later) transmits agents packets between the adaptor and dock. The dock is connected to a forwarder 1021 via a link 1031. Another link connects the forwarder to a second dock 1012 that is implemented on a hardware unit 1600. The hardware unit also implements the visa service 1103 and admin service 1104 of the SNN. The visa service and admin service are agents, connecting to the second dock 1201 via an adaptor 1202. The adaptor is also implemented on the hardware unit. Accordingly, one or more communication buses within the hardware unit may serve as the secure channels connecting the visa service and admin service to the adaptor and establishing the tie-in connecting the adaptor to the dock. The visa service and admin service may both send agent packets and authenticate over these internal communication buses.

Figure 2:
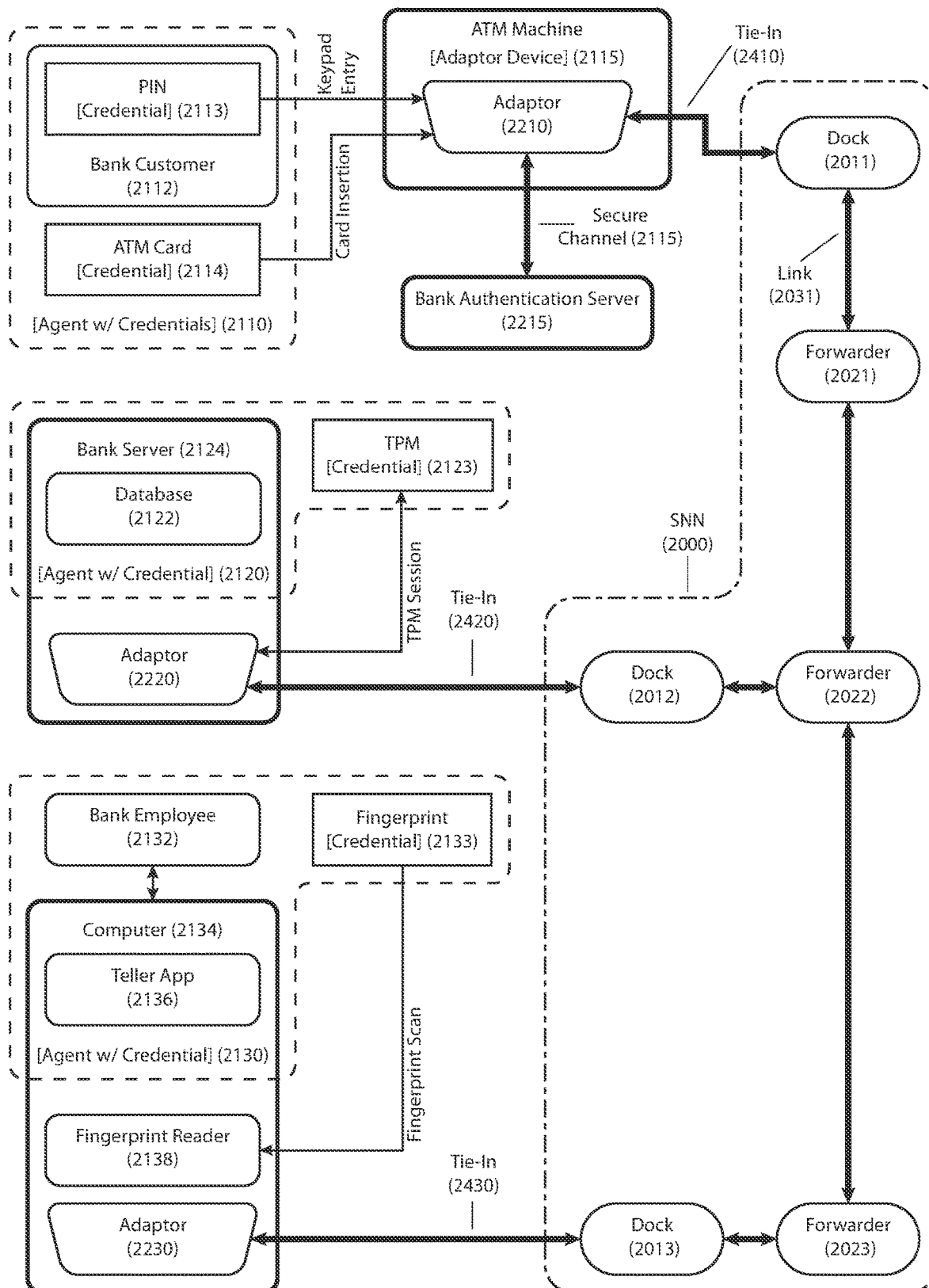
FIG. 2 shows a more specific exemplary SNS in which a SNN supports secure communication between a bank database, a bank employee, and a bank customer, in accordance with an embodiment of the present disclosure.

FIG. 2 shows a more specific exemplary SNS in which a SNN supports secure communication between a bank database, a bank employee, and a bank customer, in accordance with an embodiment of the present disclosure. In the exemplary system of FIG. 2, the SNN 2000 comprises six PPUs including three docks 2011, 2012, and 2013 and three forwarders 2021, 2022, and 2023. The PPUs are connected by links; for example, dock 2011 is connected to forwarder 2021 by link 2031.

One of the docks 2011 serves a credentialed agent 2110 that is a bank customer 2112 with knowledge of a PIN 2113 and possession of an ATM card 2114. The agent connects to the SNN through an adaptor 2210 within an ATM machine 2115 (an adaptor device). The adaptor establishes a tie-in 2410 to the dock 2011. The adaptor facilitates authentication of the agent's identity through keypad entry of the PIN and card insertion of the ATM card. To verify the attributes of these credentials, the adaptor relies upon a bank authentication server 2215, external to the SNS, with which it communicates through a secure channel 2115.

Another of the docks 2012 serves a credentialed agent 2120 that is a database 2122 hosted on a bank server 2124 with a trusted platform module (TPM) 2123. The agent connects to the SNN through an adaptor 2220 that also resides on the bank server. The adaptor establishes a tie-in 2420 to the dock 2012. The adaptor facilitates authentication of the agent's identity through a TPM session with the TPM.

Finally, a third dock 2013 serves a credentialed agent 2130 that is a bank employee 2132 using a teller application 2136 running on a computer 2134. The agent connects to the SNN through an adaptor 2230 that also resides on the computer. The adaptor establishes a tie-in 2430 to the dock 2013. The adaptor facilitates authentication of the agent's identity through a fingerprint 2133 scan by a fingerprint reader 2138.

Packet Format Overview

A SNN processes at least two types of packets: agent packets that are the packets that enter and exit the SNN through docks, and internal packets that move between PPUs across links. Agent packets are addressed with agent addresses of the source and destination agents. As they pass through a dock, agent packets are converted to and from internal packets that carry them as encapsulated agent packets. Internal packets become associated with a visa when they are converted from agent packets, and that association is carried with them as they are transmitted through the SNN.

An internal packet includes a header and a payload. The internal packet header includes a packet type and a visa identifier. One type of internal packet, called a transit packet, carries information sufficient to reconstruct an agent packet that is communicated through the SNN as an encapsulated agent packet. Other types of internal packets may be used to distribute visas. The packet formats, visa identifiers, and visas are described in more detail below.

Adaptors, Tie-Ins, and Tethers

An adaptor serves as the intermediary between agents and a SNN. An adaptor can communicate with each agent that connects through it and it may also authenticate attributes of the agent's identity. A variety of suitable communication methods can be used between adaptor and agent, many of which are familiar in the state of the art. In the preferred embodiment, the method of communication is either local sockets API invocation on shared hardware, a user interface, or a network-style communication using the Internet Protocol. The latter can be local within a system or over an external network, which may be the same as the method of adaptor-SNN communication.

Communication between an adaptor and a SNN takes place through the adaptor's tie-in. Once the tie-in is established it is used for all communication between the adaptor and a dock of the SNN. Some of this communication may be transmitted using the Selective Network Interface Protocol (SNIP). SNIP enables an adaptor to establish streams of communication through a tie-in and to cooperate with a dock in determining and authenticating the identities of agents that transmit information through the adaptor.

A tie-in is established through the method of adaptor-SNN communication to a dock of the SNN. If the method of adaptor-SNN communication is a network, an adaptor may be able to receive the network address of the address of the dock, such as through a domain name system (DNS). If the method of adaptor-SNN communication is not reliable and secure, the adaptor can establish a reliable, secure channel for the tie-in by establishing a secure communication session using protocols familiar in the art. For example, in the preferred embodiment of the invention, the method of adaptor-SNN communication is an IP network and the tie-in is a secure communication session established through that network using the QUIC protocol. In other embodiments, where the adaptor and dock are different processes on the same processor, the tie-in may be established through inter-process communication. Where the adaptor and dock are implemented as functional modules with the same hardware unit, the tie-in may be implemented as an internal hardware connection.

The policies may require some form of an authentication handshake between the adaptor and the dock to establish a tie-in. If the method of adaptor-SNN communication is not itself a reliable, secure channel, the dock may use methods known in the art to limit the resources it uses in handling requests to establish tie-ins. For example, it may ignore such requests for a certain period after it handles a request, or it may demand a digital coin or an easily verified proof of work from the adaptor for each tie-in request.

An additional method for preventing a third party from interfering with an adaptor's tie-in, when the method of adaptor-SNN communication is a network, is to change the network address of the dock used for the tie-in in a manner that can only be predicted with access to a secret shared between the adaptor and dock. In one variation of this method, the network address of the dock changes at the end of each of a series of prearranged time intervals. At the end of each interval, the next address is generated by encrypting, with the shared secret, a number associated with the next time interval. The resulting ciphertext is used as an index to locate the next address from within a group of addresses reserved at the dock. The dock supports tie-ins at the next address only during the next interval and during a changeover period before the expiration of the current interval. An adaptor that has already established a previous tie-in can establish a new tie-in at the next address during the changeover period and then use SNAP through the current tie-in to switch agent communications to the new tie-in and disestablish the current tie-in.

A tie-in may be established to a dock when the adaptor system is first initialized or is woken up, similar to other network interfaces. A tie-in persists until it fails or is disestablished by the adaptor or the dock under circumstances specified by the policies. If the tie-in fails or is otherwise disestablished, it is reestablished when the adaptor or dock needs to communicate.

Each tie-in can have one or more distinguishable streams of communication that pass through the tie-in. Each tie-in that uses SNIP has at least one stream, called its SNIP stream, that is used by the adaptor to communicate using SNIP. As noted above, a SNIP stream enables the adaptor to cooperate with a dock in determining and authenticating the identities of agents that transmit information through the adaptor. A SNIP stream also enables the adaptor to establish additional streams A tie-in may not be required to use SNIP for these functions; a dock and adaptor may have alternative approaches for performing the functions supported by SNIP. For example, a dock and adaptor may use such alternative approaches when the dock and adaptor are implemented on the same hardware device.

SNIP allows the adaptor to establish additional streams called tethers for transmitting agent packets to and from the SNN. Each tether through the tie-in to a dock is assigned a unique number by the dock. The unique number is used in conjunction with the PPU number of the dock to form a unique tether address for each tether in the SNN. Each tether has exactly one tether address. A security advantage of a SNS is that tether addresses are not visible outside of the SNN, which hides such internal information from the adaptors and agents.

An adaptor handles agent packets to and from the agents that connect through it. Each agent packet that an adaptor transmits to the SNN specifies the source agent's address in the header of the agent packet. Each agent does not necessarily use a single agent address and each agent address is not necessarily only associated with a single agent. The adaptor may handle a range of network addresses, defined for example by an address prefix. This may be used to facilitate the use of an adaptor as a gateway to another network.

When multiple agents using the same agent address are connected to the SNN via the same tie-in, packets addressed to different agents may use different fields in the agent packet such as port numbers and protocols, to distinguish among the agents. The adaptor may then deliver packets to the proper agent based on these fields.

Once an adaptor has transmitted an agent packet through a tether using a particular agent address as a source agent address, the visa service records that source agent address as associated with the tether, allowing other agents to transmit packets to that agent through that tether. In some embodiments of the invention, an agent can inform the SNN that it is available to receive packets addressed to a specific agent address by transmitting an agent packet from that specific address to a reserved NULL address through the adaptor.

More than one agent may communicate over a single tether, for example agents that are different applications running on the same machine. Depending on the connection policies, it may be possible for a single agent to have more than one tie-in to a SNN at the same time, at the same or at different docks. In such a case, the agent has multiple tether addresses. For example, a single human agent may use multiple devices simultaneously. An adaptor may also communicate with more than one SNN, in which case it uses separate docks and tie-ins for each.

In the preferred embodiment of the invention, where the method of adaptor-SNN communication is an IP network and the tie-in is a secure communication session established through that network using the QUIC protocol, a bi-directional stream of the QUIC connection is allocated to each tether.

Compliant Flows

A compliant flow is a stream of communication through the SNN between adaptors and, by extension, between the agents connecting to the SNN via the adaptors. The compliant flow is compliant both in the sense that it complies with policies and in the sense that it accommodates changing conditions and changing policies. A compliant flow is preferably bi-directional. Visas are associated with packets communicated in each direction of a compliant flow. Compliant flows are secure channels. The identity of the source agent of each packet is authenticated over the entire compliant flow, from adaptor to adaptor, and policies are enforced from dock to dock.

Compliant flows are not always transmitted across the same sequence of tethers and links, but a SNS may take advantage of the fact that they often can be transmitted across the same tethers and links. Forwarders, for example, may first try transmitting a packet on the same link that was used to transmit the previous packet of the same compliant flow. In some embodiments, a dock can find applicable visas for incoming agent packets more efficiently if the packets from the same compliant flow travel through the dock on the same tether and packets from different compliant flows travel on different tethers. For this reason, an adaptor preferably creates and uses different tethers for different compliant flows through the adaptor. For example, adaptors may attempt to associate specific compliant flows from one agent with a specific tether to help improve the efficiency or performance of the dock. However, because the adaptor does not necessarily know the policies of the SNN, adaptors may still send packets from different compliant flows through the same tether. The separation of different compliant flows onto different tethers provides opportunities for efficiency, but the SNN does not require it, nor does it rely on an adaptor to always route packets from the same compliant flow through the same tether. Preferably, the SNN requires the adaptor to use different tethers to transmit packets originating from different networks that use conflicting packet addresses.

A SNN may also support other types of flows such as uni-directional multicast flows that are also policy compliant.

SNN Address Space

Each SNN has an associated SNN address space, defining the addresses to which the SNN can deliver packets. A SNN address space may be defined, for example, by a set of address prefixes. It is not necessarily contiguous. Agent packets transmitted through a SNN can have destination agent addresses in the SNN address space of that SNN. To receive such packets, agents can either be directly connected to that SNN, or reachable through the SNN, for example through a gateway to another network. A SNN address space may include both addresses that are statically assigned and assigned dynamically via DHCP-like mechanisms. Operating systems of computers that communicate through a SNN automatically direct packets addressed to addresses within a SNN address space through the SNN associated with that SNN address space.

In the preferred embodiment, the SNN address space is a portion of the IP address space and may include portions of the IP address space that have public IP addresses or specific private IP address spaces.

As with many private IP networks, SNS admins may select portions of the IP address space that do not conflict with other addresses used on the network for use as private addresses for the SNN. Just as the Internet Protocol globally reserves portions of the IP address space for private addresses, there may be a globally reserved portion of the IP address space for private SNN addresses, called the SNN private address space. A SNN may use at least a portion of the SNN private address space in its SNN address space, called the private address portion of the SNN address space. In addition to the usual allocations for static and dynamically allocated addressees, the private address portion of the address space may be used for SNN-internal addresses, redirect addresses, and externally-accessible SNN service addresses.

SNN-internal addresses are used by the SNN's visa service, admin service, and management services. The policies only allow these services to communicate internally within the SNN.

A redirect address uniquely specifies the pairing of a tether with an IP address outside of the SNN address space. Redirect addresses provide a way for an agent without an allocated SNN address to send a packet through a SNN and receive a reply to the packet through the SNN. They may be used, for example, by an agent with a publicly registered IP address that is referenced by a SNN policy, or by an agent needing to obtain an address in the SNN address space by contacting a DHCP server through the SNN.

Redirect addresses are allocated by the visa service whenever a visa is issued for a packet with a source agent address outside of the SNN address space. The redirect address is associated with the tether on which the packet entered the network. A dock inserts the redirect address into the source agent address field of any agent packets reconstructed for delivery under the visa. Correspondingly, a dock inserts the original IP address into the destination agent address field of any agent packets reconstructed for delivery through the associated tether under a visa issued for agent packets with the redirect address in the destination agent address field. Alternatively, a dock can reconstruct a packet as transmitted and use methods known in the art to perform a Network Address Translation (NAT) on the packet, translating between the IP address outside of the SNN address space and the redirect address.

Redirect addresses allow, for example, client agents to connect to an external service accessible through the SNN, such as a web server, file server, DNS, or database server, at a publicly registered address in the SNN address space. A client agent, recognizing that the IP address of such a server obtained via a DNS lookup resides within the SNN address space, sends agent packets destined for the server through an adaptor. When issuing a visa for the first of these agent packets, the visa service, recognizing that the source address of the client agent is outside of the SNN address space, allocates a redirect address for the source agent address of the packet, associated with the tether on which the agent packet entered the SNN, and issues the visa. The dock reconstructing agent packets from the client agent replaces the source address of the client with the redirect address in the source agent address field. This facilitates the direction of future return IP packets from the service agent back through the service agent's adaptor and back to the tether. The dock reconstructing a return agent packet may then replace the redirect address in the destination agent address field with the client's original agent address before delivery to the client.

Externally-accessible SNN service addresses are used to access external services provided by a SNN. One such service that can be provided by a SNN is an address registration service, that allows an agent to announce that they are ready to receive packets through a particular tether for a specified address. Packets addressed to the externally-accessible address registration service from the address to be registered are interpreted as registration requests. When such packets enter the network and are successfully issued a visa and, in some cases, redirect addresses, a confirmation is delivered back to the agent to confirm that it has registered successfully. Because the issuance of the visa requires that the registration is allowed by policy and that any required authentications have been performed successfully, the address registration service only honors and confirms registration requests that are specifically allowed and authenticated according to policy. In some embodiments, the address registration service is embodied by the PEPs (described later) of the policy that handles such packets. Another externally-accessible SNN service address that may be provided is a DHCP service that issues leased addresses in the private address portion of the SNN address space.

There are other address spaces associated with a SNS that have address spaces that are not a part of the SNN address space. Internal packets are delivered using the tether address space, which is related to the PPU numbers defined by the configuration. Tether addresses are not visible outside the network. Also, as described earlier, links and tie-ins may be implemented on other networks serving as the internal network or the method of adaptor-SNN communication, each with their own address space. These networks and their associated address spaces may or may not be visible outside of the SNS, depending on whether other types of communications are carried on those other networks.

Exemplary Adaptor

An exemplary type of adaptor is one that serves as an adaptor for agents using legacy software applications designed to communicate by a standard Internet Protocol, such as the IPv6 protocol. Using such adaptors, legacy software applications can communicate through a SNN using IPv6 packets with destination addresses in the SNN address space. The applications configure their network interfaces to route packets addressed to the SNN address space to an adaptor.

As described in more detail below, the SNN uses SNIP to interact with adaptors to assist in determining and authenticating the identity of an agent that is communicating through the adaptor. In the case of a legacy software application that docks via the exemplary adaptor, the adaptor may use information available through the operating system to assist in determining and authenticating the identity of the agent. For example, the agent may be the combination of the software application and a current user, and the adaptor may also use information available through the operating system to assist in determining and authenticating the identity of the user and the identity of the software application image.

Configurations

A configuration consists of a policy specification and configuration-required resources associated with each hardware unit of the SNN. The configuration-required resources include any specific software or data that may be required by the hardware units to facilitate the use of the configuration. Each configuration may also define a visa format, define a visa-service protocol, and provide software for the visa service. Each configuration also associates a PPU number with each PPU in the SNN, and it may assign forwarding tables to each forwarder. When both PPU numbers and forwarding tables are associated with a configuration, the PPU numbers may be assigned advantageously to take advantage of other aspects of the configuration, such as the link topology, to facilitate the generation of efficient forwarding tables. The PPU number associated with an internal dock may also encode information indicating the hardware type of the hardware unit implementing a management service connected to the internal dock. This information may be used, for example, to facilitate efficient distribution of configuration-required resources required by management services operating on hardware units of a particular hardware type.

The configuration-required resources may include configuration parameters that are available to all PPUs. The configuration parameters may include a maximum transmission unit (MTU), which is the MTU of the link with the smallest MTU in the configuration minus the size of the internal packet header. The MTU specified in the configuration parameters may not match the MTU actually implemented by each individual link, and the docks may fragment large agent packets into smaller internal packets. The configuration parameters may also include a maximum allowed path length, which is the maximum number of links a packet is allowed to traverse as it travels from the ingress dock to the egress dock. Each configuration also has admin service addresses and visa service addresses, which are preferably allocated unpredictably from the address space reserved for SNN-internal addresses.

A configuration does not include the state of the SNNs working memory such as packets in transit, the dock state of docks, or the forwarder state of forwarders. A key behavior of a SNS is that configurations can be changed while the network continues to operate. Internal packets continue to be transported through the network under the policies of the configuration under which they entered the network.

At least two configurations may be stored in a SNN concurrently, each of which is associated with a unique configuration ID and a configuration status. In the preferred embodiment of the invention, only two configurations are stored in a SNN concurrently, and the two associated configuration IDs are the only two valid configuration IDs.

The configuration status of a configuration typically progresses from UNDEFINED, to DEFINED, optionally to TESTING, and finally to ACTIVE. Only a single configuration, referred to as the active configuration, has an ACTIVE configuration status at any given time. When a new configuration's status becomes ACTIVE the previously active configuration's status becomes DEACTIVATING and eventually reverts to DEFINED.

Configuration changes are communicated through SNAP. When a SNN is initialized, the status of one configuration is ACTIVE, and the status of all others is UNDEFINED. Any configurations that have UNDEFINED status can be edited by specifying incremental changes. For efficiency, SNAP also allows any UNDEFINED configuration to copy information from any DEFINED, TESTING or ACTIVE configuration, leaving its status UNDEFINED. This facilitates incremental updates to existing configurations.

Once a configuration has all the required associated information, SNAP allows the status of the configuration to be switched to DEFINED. SNAP also allows the status of a DEFINED configuration to be switched to ACTIVE or TESTING and a TESTING configuration to be switched to ACTIVE. Several configurations may be DEFINED, but only one is ACTIVE. When a new configuration becomes ACTIVE, the status of the previously active configuration is first switched to DEACTIVATING.

Before switching the status of a configuration to ACTIVE or TESTING the admin service causes the loading of any configuration-required resources into the appropriate hardware units, the allocation of any required configuration-required resources, and the creation of any communication sessions required to activate the configuration. When the status of a configuration is switched to DEACTIVATING, deactivation takes place in two phases. The first phase is to wait until all packets that are associated with visas associated with the configuration ID of the deactivating configuration are delivered or discarded. The second phase is to cease to store all such visas and de-allocate all resources allocated for those visas, including dock and forwarder state that was allocated for them, and to disestablish any links that are not being used by some other configuration with ACTIVE, TESTING, or DEACTIVATING status. Once these two phases are complete, the configuration status is automatically changed to DEFINED.

A SNN may also test a configuration before it becomes active to cause visas associated with that configuration to be issued, distributed, and tested. For example, in some embodiments it is possible to test a DEFINED configuration, referred to as the test configuration, before making it the active configuration, by setting its status to TESTING. When an ingress dock processes an agent packet in the active configuration, it may also process the packet as if the test configuration was active, generating an internal packet called a test packet. The test packet's visa is associated with the test configuration. When the egress dock processes a test packet, it does not actually deliver the reconstructed agent packet, but merely checks it would have been delivered to the same destination in the test configuration as it was in the active configuration. If there is any difference, that difference is logged. This allows a test configuration to be tested to determine which packets delivered or discarded in the test configuration would be discarded or delivered in the active configuration. It also allows visas used by the test configuration to become issued and distributed in advance of the test configuration becoming the active configuration.

A SNN may also limit the rate at which the visas associated with a test configuration are issued, distributed, and tested. A test packet does not need to be generated for every agent packet processed in the active configuration. For example, a dock may wait for a period of time after the test configuration status is set to TESTING before such a visa is requested and may use its PPU number to select that period of time so that different docks begin testing at different times. Once a dock has requested a visa in the test configuration, it may not generate further test packets for a period of time after it receives a response to that visa request. Once a dock has sent a test packet using a visa, it may not use that visa to send further test packets. These methods may be used advantageously to limit demands made on the SNN by the testing of the test configuration.

Figure 3:
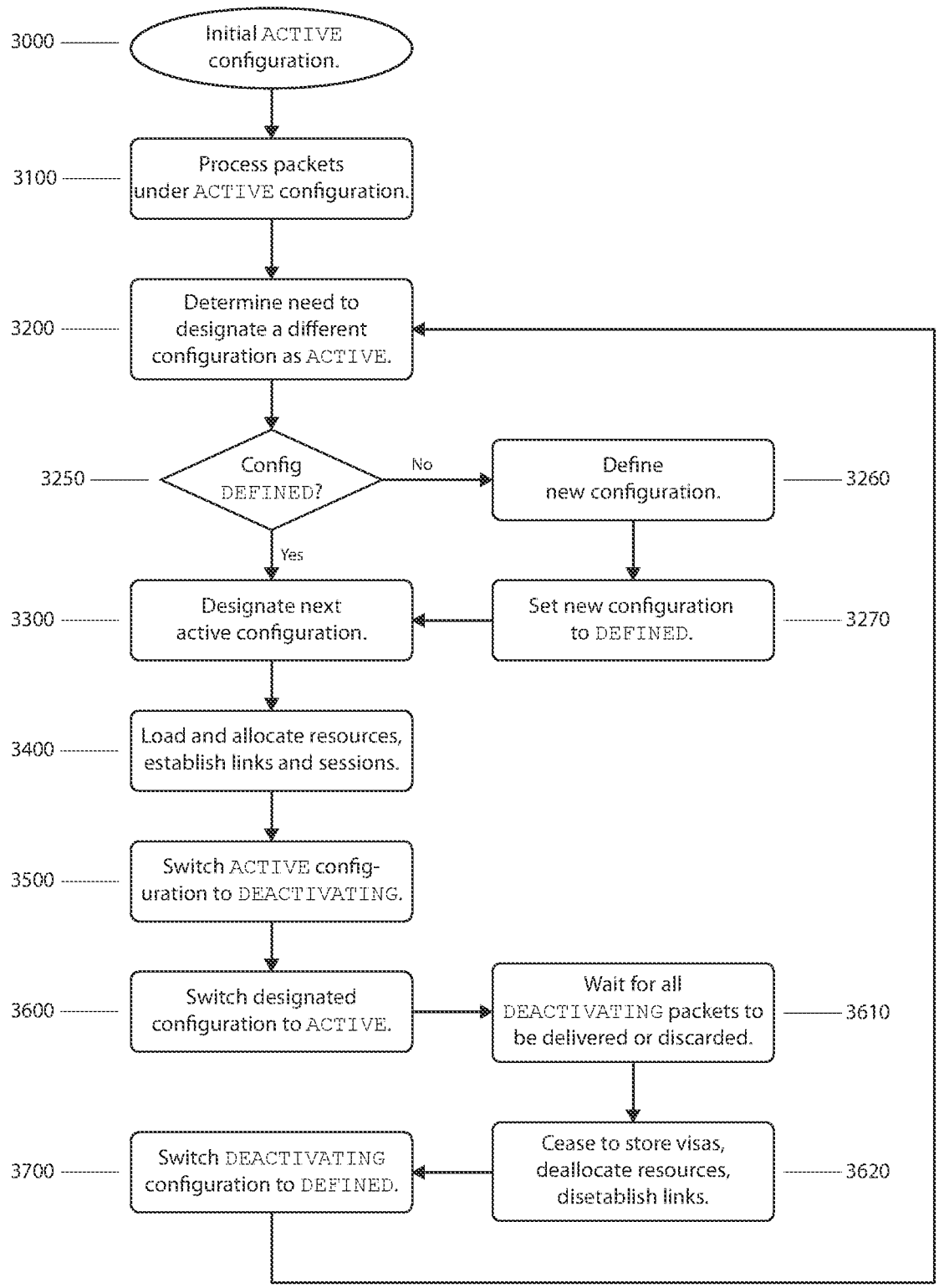
FIG. 3 shows a flow chart summarizing the definition, activation, and deactivation of configurations, in accordance with an embodiment of the present disclosure.
Figure 4:
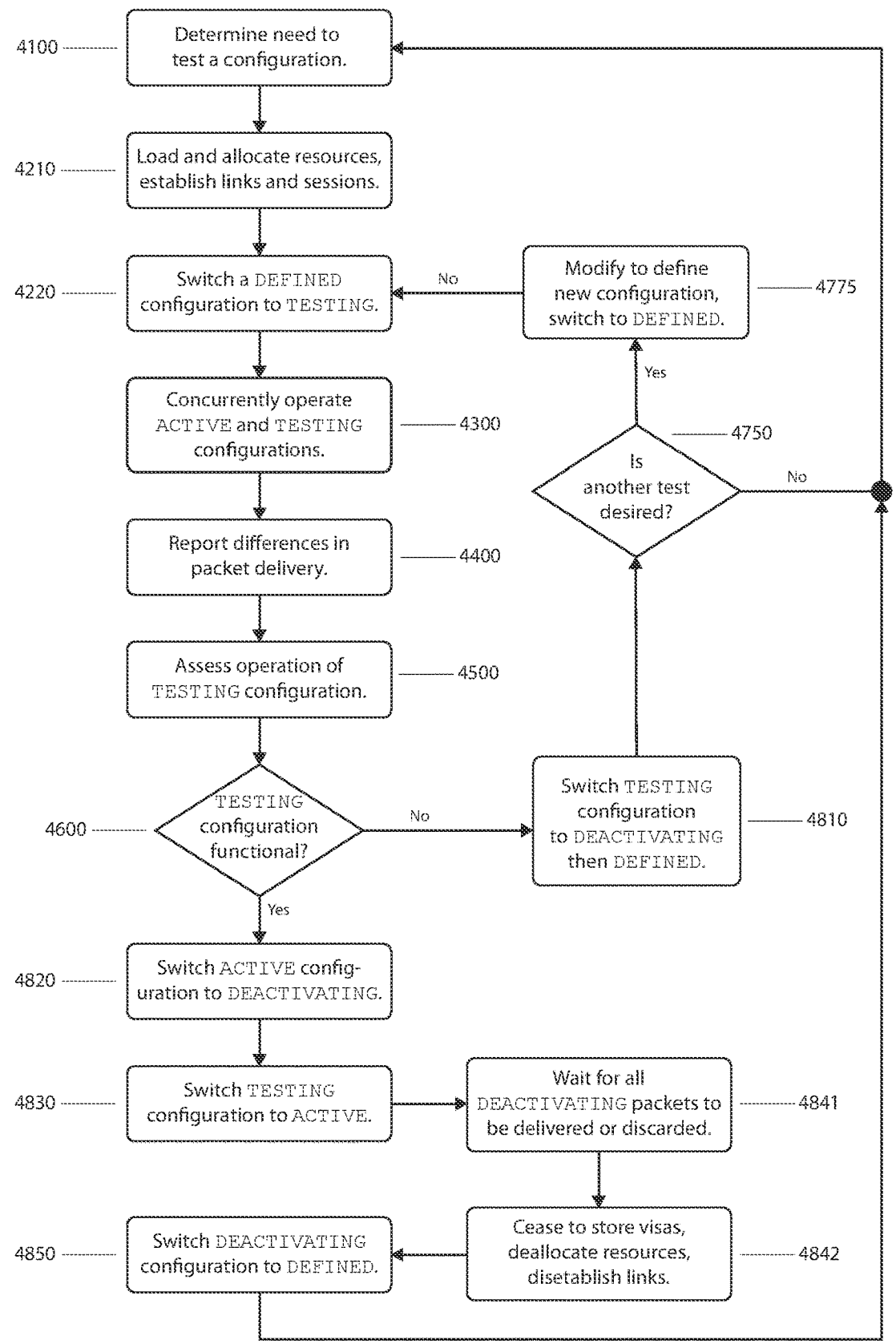
FIG. 4 shows a flow chart summarizing a testing process by which a configuration is tested via concurrent operation with a currently active network configuration, in accordance with an embodiment of the present disclosure.

The above techniques for managing configurations are illustrated in FIG. 3 and FIG. 4. FIG. 3 shows a flow chart summarizing the definition, activation, and deactivation of configurations, in accordance with an embodiment of the present disclosure. An admin uses the startup channel to establish an initial configuration with ACTIVE status 3000. The SNN begins operation by processing packets 3100 under this ACTIVE configuration.

When the admin determines 3200 the need to designate a different configuration as ACTIVE, the admin determines 3250 whether the desired configuration is already DEFINED. If the desired configuration is not already DEFINED, the admin defines 3260 a new configuration, then sets 3270 the newly defined configuration to DEFINED. If the desired configuration is already DEFINED, or after it has been defined and set to DEFINED, the admin designates 3300 the desired DEFINED configuration as the next active configuration.

In response, the SNN loads and allocates the required resources and establishes the links and sessions 3400 required by the connection policies of the designated configuration. The PPUs then switch 3500 the ACTIVE configuration to DEACTIVATING and switch 3600 the designated DEFINED configuration to ACTIVE. The PPUs then wait 3610 for all packets associated with a visa associated with the configuration ID of the DEACTIVATING configuration to be delivered or discarded. The PPUs then cease to store all such visas, deallocate all resources allocated for such visas, and disestablish any links 3620 required for the DEACTIVATING configuration that are not being used by another ACTIVE, TESTING, or DEACTIVATING configuration. Finally, the admin service automatically switches 3700 the DEACTIVATING configuration to DEFINED.

The network then continues to operate under the newly ACTIVE configuration. The above process can be repeated when an admin again determines 3200 the need to designate a different configuration as ACTIVE.

FIG. 4 shows a flow chart summarizing a testing process by which a configuration is tested via concurrent operation with a currently active network configuration, in accordance with an embodiment of the present disclosure. The testing process begins when an admin or a tool used by an admin determines 4100 the need to test a configuration. The admin then requests that the SNN load and allocate the required resources and establish the links and sessions 4210 required by the connection policies of the configuration to be tested. The admin then switches 4220 a DEFINED configuration to TESTING. The DEFINED configuration may be a newly defined configuration or may be a previously defined configuration. The network then operates 4300 both the ACTIVE and TESTING configurations concurrently, with each dock within the network reporting 4400 the differences in how packets would be delivered under the two configurations. Based on these discrepancies, the admin (or the admin service on behalf of the admin) assesses 4500 the operation of the TESTING configuration.

As described above, a test packet may be generated by a dock when it sends a packet under the ACTIVE configuration. Test packets are associated with visas issued under and associated with the TESTING configuration. When an egress dock processes a test packet, it does not actually deliver the reconstructed agent packet, but merely checks that it would have been delivered to the same destination under the TESTING configuration as it was in the ACTIVE configuration. If there is any difference, that difference is reported 4400.

If 4600 the TESTING configuration is judged to be functional, the PPUs then switch 4820 the ACTIVE configuration to DEACTIVATING and switch 4830 the TESTING configuration to ACTIVE. The PPUs then wait 4841 for all packets associated with a visa associated with the configuration ID of the DEACTIVATING configuration to be delivered or discarded. The PPUs then cease to store all such visas, deallocate all resources allocated for such visas, and disestablish any links 4842 required for the DEACTIVATING configuration that are not being used by another ACTIVE, TESTING, or DEACTIVATING configuration. Finally, the admin service automatically switches 4850 the DEACTIVATING configuration to DEFINED.

If 4600 the TESTING configuration is not judged functional, the admin switches 4810 the TESTING configuration to DEACTIVATING and then to DEFINED. The admin then determines 4750 whether another test is desired. If not, the system continues to operate under the existing ACTIVE configuration until an admin again determines 4100 the need to test another configuration. If another test is desired, the admin defines a new configuration by modifying 4775 the definition of the recently tested configuration and switching the modified configuration to DEFINED. The admin can then perform additional testing of the network operating under the modified configuration by switching 4220 the modified configuration to TESTING.

Communication Policies

Communication policies describe which agents are allowed to communicate through the SNN, the circumstances under which they are allowed to communicate, and which resources they should be allocated for their communication. The circumstances may include the time, where and how the agent is connected to the SNN, what ports and packet formats are being used, the identity attributes and authentication status of the agent, and information provided by a trust evaluation service. For example, a restrictive policy could allow an authenticated agent to send packets with a specific port number to another authenticated agent at limited bandwidth only if it is connected to the network at a specific dock during a specific time period.

Communication policies may also specify limits on when, how much, and at what rates those agents are allowed to communicate. Such limits may be specified in terms of the volume or rate of information that one agent is allowed to transmit to another agent within a specified time interval. Time intervals may be specified to restrict communication to a particular schedule or restrict the volume of information communicated during the interval.

Communication policies may also specify how much bandwidth should be reserved through PPUs to carry the packets associated with a visa and in what circumstances that bandwidth is reserved. Because PPUs can only support a limited bandwidth of communication, a visa provides a way to reserve a specific amount of that bandwidth for communication under the visa. Because the visa service is aware of all visas issued, it may use this information to refuse to issue visas that might require more bandwidth than is available on each PPU.

Preferably, the volume of information communicated by the packet and the corresponding rates are measured by the number of bits of payload. Other volume measures may be used, such as the total number of bits in the packet, or the number of packets. Rate specifications may also specify the interval of time over which the rate is measured. For example, a policy could allow packets from agent A to agent B to transmit a volume of ten thousand bits of payload during each weekday, at a maximum rate of one packet per second over any ten-second interval. The exemplary policy might also only allow agent A to send packets with a specific port number through a tie-in to a specific dock.

Although it is not the preferred operating mode for a SNN, a very broad policy could allow every agent to send any packets, claiming to be from any source, without any form of authentication, at any available bandwidth, at any time, from any location, to any other agent address. This more lenient policy would result in a SNN that functions in a manner similar to the public Internet.

Authentication Policies

Authentication policies specify how and when the SNN determines and authenticates the identity of agents. Agent authentication policies are enforced by the visa service. The agent authentication policies specify methods available for authentication of the attributes of an agent's identity, and the maximum interval of time for which an authentication can remain valid.

The methods of authenticating identity attributes preferably include a challenge-and-response procedure requiring the agent to demonstrate that it has access to specific sets of required credentials to formulate a valid response. For example, a credential may be a password, a private cryptographic key, an authentication token generated by an authentication service or hardware device, a specific piece of biometric information such as a fingerprint, or a certificate issued by a trusted entity. A successful response demonstrates to the challenger that the agent has access to the credentials. Using methods that are known in the art, such as public key infrastructure, authentication may take place without the challenger obtaining a copy of the credentials. Authentication may require interaction with a Trusted Platform Module (TPM) associated with the agent. It may be facilitated by a trust evaluation service that utilizes methods well known in the art, such as statistical signatures of communication and timing, and external reports.

In addition to the methods of authenticating agent identity attributes, the SNS can verify the association of an agent's identity attributes with each other and with the tie-in that the agent uses to communicate with the SNN. An adaptor may demonstrate this association by proving its access to the tie-Proprietary in and to credentials of the agent. The adaptor may prove its access to the tie-in by transmitting the agent packets through the tie-in and demonstrate its access to the credentials by facilitating the authentication of the identity attributes. The authentication can take place between the challenger and the agent or its adaptor, or it can rely on a trusted authentication service that may be external to the SNS. In either case, the authentication may be associated with the tie-in by communicating information enabling the authentication through the tie-in.

The agent authentication policies may specify that an authentication expires after a certain time. They may rely on a trust evaluation service to specify which methods of authentication are used, and when they expire. Agent authentication policies may also specify that the visa service should attempt to reauthenticate an agent when an existing authentication is about to expire. Authentication may also expire in certain specific circumstances, such as when the credentials that were used to authenticate cease to be honored. The cessation of honoring a specific credential can be specified through the SNAP protocol. Such a cessation is preferably not treated as a change in policy.

Other authentication may take place in the operation of the SNS, such as the authentication of adaptors and PPUs for the establishment of docks and links as specified by the connection policies. Such authentications may be governed by the authentication policies but are not considered to be a part of the agent authentication policies. Authentication policies also include any public keys used to verify signatures or encrypt or decrypt information, such as any public key or keys that may be used by the visa service to endorse visas (as described later).

Connection Policies

Connection policies determine any internal and external communication system addresses of the PPUs or hardware units that are required for the operation of the SNN and a specification of the links that are to be established between them. Connection policies also specify how a PPU to establishes secure channels for tie-ins; reliable, secure channels for SNIP streams; reliable, secure channels to services such as the visa service; and secure channels for links. The connection policies also specify protocols for determining any addresses, certificates, keys, credentials, and visas required for establishing the secure channels. Such protocols may be standard secure transport protocols such as QUIC, Host Interface Protocol, Transport Layer Security Protocol, or IPSEC protocols. The connection policies also specify which secure channels should be established before a configuration is activated or tested and which secure channels should be established dynamically and under what circumstances.

The connection policies may also specify limits on which adaptors are allowed to establish tie-ins at which docks of the SNN. In determining these restrictions, the connection policies may depend on the time and on the trust evaluation service to assign trust measures to PPUs or adaptors. Connection policies also specify what portions of each PPU's memory or each hardware unit's memory are provisioned for use by each allocation pool (described later).

The connection policies also specify the topology of PPUs and links. This topology preferably allows every PPU to communicate, either directly or indirectly, with any other. For example, the policies may specify that links are established directly between every pair of PPUs. Alternatively, if the internal communication system only allows some pairs of PPUs to communicate directly, for example because of network firewalls, the connection policies may specify links between only those PPUs. In a large SNN, it may be advantageous for the connection policies to specify sparser links. In this case, the policies also define a method of routing packets through intermediate PPUs to the destination PPU. For example, the connection policies may specify linking the PPUs in the pattern of an n-dimensional cube. In this case, methods known in the art, including those described in U.S. Pat. Nos. 5,117,420, 5,151,996, and 5,530,809, allow packets to be forwarded to their intended destinations by traveling over multiple links.

Reporting Policies

Reporting policies specify what information is reported by a SNN. Such reports may be used to monitor or adjust the behavior of the SNS. Reports may be sent to the admin service, the visa service, a management service, or other services, and these services may take actions in response to the reports. Reporting of information may include direct reporting or logging of information for future analysis. For example, attempts to send packets that are not in compliance with policy may be reported to a trust evaluation service as well as logged. Reporting policies ensure that reporting only takes place when the resources to do it are available. For example, reporting policies specify rules for the management of storage space available for logged information. Once storage space for logs becomes scarce, this scarcity condition is reported, and logging is adjusted to match the available resources. SNAP allows admins to read logs and to explicitly delete logged information. All reporting policies preferably have limits to the resources they demand, in part to protect the network from attack by flooding.

Internal Communication System

The internal communication system is used to implement the links between PPUs. The internal communication system is also used to implement reliable, secure channels for communication between PPUs and SNN services. As described above, the connection policies specify how and when links are established. Once established, a link persists until it either fails or policy requires that it expires. When a link fails, the failure is reported. A link from a PPU has at least one outgoing link stream, and each outgoing link stream has an associated incoming link stream. A PPU transmits internal packets on outgoing link streams and receives internal packets on incoming link streams.

In the preferred embodiment, the internal communication system includes both an internal network and shared memory, and links are reliable, secure channels. Links between PPUs implemented on the same hardware unit are implemented using the shared memory of the internal communication system. Links between PPUs on different hardware units are implemented as secure sessions through reliable, secure channels established over the internal network using transport protocols such as the QUIC protocol.

Announcements

Announcement is a function supported by the SNN that allows information to be shared with many or all PPUs or services within the SNN. Announcement may be implemented in a number of different ways, and different announcements may use different methods of announcement. In the preferred embodiment, announcements are implemented through the SNN using a visa that specifies a broadcast announcement or a targeted announcement. Alternatively, announcement may take place over inter-PPU announcement streams reserved for that purpose.

A broadcast announcement is a simple method of announcement in which the same information is communicated to every PPU. Broadcast announcement is the preferred method for announcing new information that is stored at every PPU. In cases where it can be determined in advance that some PPUs do not need certain information, targeted announcement may be accomplished by sending the information only to the PPUs that may need it.

The admin service may use broadcast or targeted announcements to switch configurations or distribute configuration-required resources. As described above, PPU numbers within a configuration may be chosen to facilitate efficient targeted announcements, for example targeted announcements to internal docks implemented on hardware units of a certain hardware type. Preferably, a range or pattern of PPU numbers can be used to specify an announcement target.

Announcement may also be accomplished by storing information in a distributed database that moves the information to a PPU when it is needed. For example, rendezvous announcement distributes announced information to specific locations in the network where all PPUs know to find it. These rendezvous locations may be distributed across different PPUs in the network so that the burden of storing the announced information and responding to queries for the information is spread across multiple PPUs. This method is particularly advantageous for announcements of the association between a key and a value. In such a case, hash functions computed on the key may be used to determine the rendezvous storage locations for the value. Such announcements may be used, for example, to implement the visa service in a distributed manner across multiple PPUs.

Dock State and Forwarder State

Each PPU has associated state information called its PPU state. PPU state includes the state information that the PPU requires to process packets, including stored visas and the associated information required to process packets associated with the visas. This associated information includes the information required to track the rate and volume of information that is transmitted in association with those visas. PPU state may also include state information required to maintain a reliable, secure channel with the admin service or visa service. Finally, PPU state includes the link state associated with the connected links and their streams, and an internal packet processing buffer for storing internal packets awaiting processing. The PPU state of a dock is called its dock state, and the dock state of a forwarder called its forwarder state.

The dock state of a dock also includes an agent packet processing buffer for storing agent packets awaiting processing. The dock state also includes the tie-in state associated with each of its tie-ins, which includes the information required to maintain the tie-in and the tether state associated with each tether that passes through the tie-in. Finally, the dock state also includes any visa ingress data or visa egress data (described later), including the visa key, associated with each visa the dock stores.

Policy Enforcement Procedures (PEPs)

Admins may describe policies using a wide range of policy description languages. The resulting policy specification is compiled into procedures called Policy Enforcement Procedures (PEPs) that may be associated with a visa and executed by the PPUs. Execution of a specific type of PEP requires access only to specific types of information. The executing PPU is granted access only to this specific type information and restricted to specific kinds of actions when executing a type of PEP. These limitations and restrictions may be enforced either or both when the PEPs are compiled and at the time they are executed by the PPUs.

Each PEP is associated with a unique PEP ID that may be used to specify the PEP within a visa. Preferably, at least some PEPs and their associated IDs are distributed to hardware units as configuration-required resources. Other configuration-specific software used by the PEPs, such as the software that implements visa-service protocols may also be distributed as configuration-required resources.

There are three types of PEPs: connection PEPs, reporting PEPs, and communication PEPs.

Connection PEPs, compiled from connection policies, are announced, so that they can be stored and executed by PPUs whenever tie-ins, links, and reliable, secure channels to services are established, disestablished, or reestablished. Connection PEPs have access to the tie-in state of a dock's tie-ins, their state of trust as determined by the trust evaluation service, and to credentials and addresses that are required to establish tie-ins, links, and reliable, secure channels to services. Connection PEPs can send and receive information over the internal communication system or method of adaptor-SNN communication, invoke reporting procedures, invoke authentication procedures, communicate with the visa service, and establish docks and links. When a tie-in is established, the connection PEPs interact with the visa service to request permission to establish the tie-in and obtain any required authentications from the adaptor for establishing the tie-in. The connection PEPs execute the protocol required to establish the connection between the adaptor and dock.

Reporting PEPs are compiled from reporting policies and are announced, so that they can be stored and executed by the PPUs whenever conditions arise that may require reporting. Reporting PEPs have access to the information passed to them about those conditions. They also have read access to the state of the hardware unit in which they are executed. For instance, the PEP reporting the receipt of an invalid packet is passed the bad packet when it is invoked. The hardware unit state includes an indication of the available local storage for logging information. The reporting procedure can use this information to construct and send messages to specific reporting-related services within the SNS, or to record new log entries within the hardware unit's local logs.

Two types of communication PEPs are compiled from communication policies; one type is used by docks and the other by forwarders. Either type of communication PEP may be optimized to take advantage of special packet processing hardware available on the hardware unit of the PPU. All communication PEPs have access to the public keys of the visa server.

Dock PEPs govern the conversion of incoming and outgoing packets at docks. For example, in the preferred embodiment of the invention, dock PEPs determine how docks represent agent packets within transit packets when they enter the SNN and reconstruct them when they exit the SNN. There are different dock PEPs for ingress and egress docks. Dock PEPs have access to the agent packet, the internal packet; the dock state of the dock in which they are executing, the admin service, and the visa service.

Forwarder PEPs are invoked by forwarders to transmit or discard an internal packet as it is transported through the SNN. Forwarder PEPs have access to the packet's visa and the header of the packet. The forwarder PEP also has access to the forwarder's forwarder state, which includes all forwarder state conditions that are relevant for determining how to process the packet. For example, the forwarder state may include the forwarder's internal communication system address, the current time and physical location of the forwarder as determined by the forwarder's hardware unit, the state of its allocation pools, the link state of links and link streams, information obtained by the forwarder from the trust evaluation service, and any forwarding tables provided as part of the configuration-required resources. Typically, the associated parameters of the visa (described later) include the tether address of the destination, although in some cases, such as a broadcast visa, the destination tether address may be implied by the algorithm encoded into the forwarder PEP. Preferably, the rate limits that are used by the forwarder PEPs are slightly less limiting than the rate limits of ingress dock PEPs associated with the same visas, so that unless a part of the SNN becomes compromised, rates are limited by the ingress dock even if there is some imprecision in the measurement of rate.

The communication policies allow bandwidth resources to be allocated to compliant flows, according to the allowances specified in the associated parameters of the visa. In some embodiments, packets that may be processed by communication PEPs pass through a packet processing buffer that prioritizes packets according to the quality of service (QOS) under which they are sent. When a PPU attempts to add a packet to a packet processing buffer, it first checks if processing the packet would exceed any volume or rate limits specified in the associated parameters, for a first QOS. If the packet could not be sent at that first QOS, it checks the next QOS, and so on. If the packet could not be processed without exceeding the volume or rate limits, the packet is discarded. Otherwise, it is enqueued in the processing buffer, ahead of all the packets enqueued at a lower QOS. An egress dock PEP, described in more detail below, keeps track of the volume of traffic that was used by the visa for each QOS. When a visa expires, the egress dock reports these volumes to the visa service.

Visas

Figure 5:
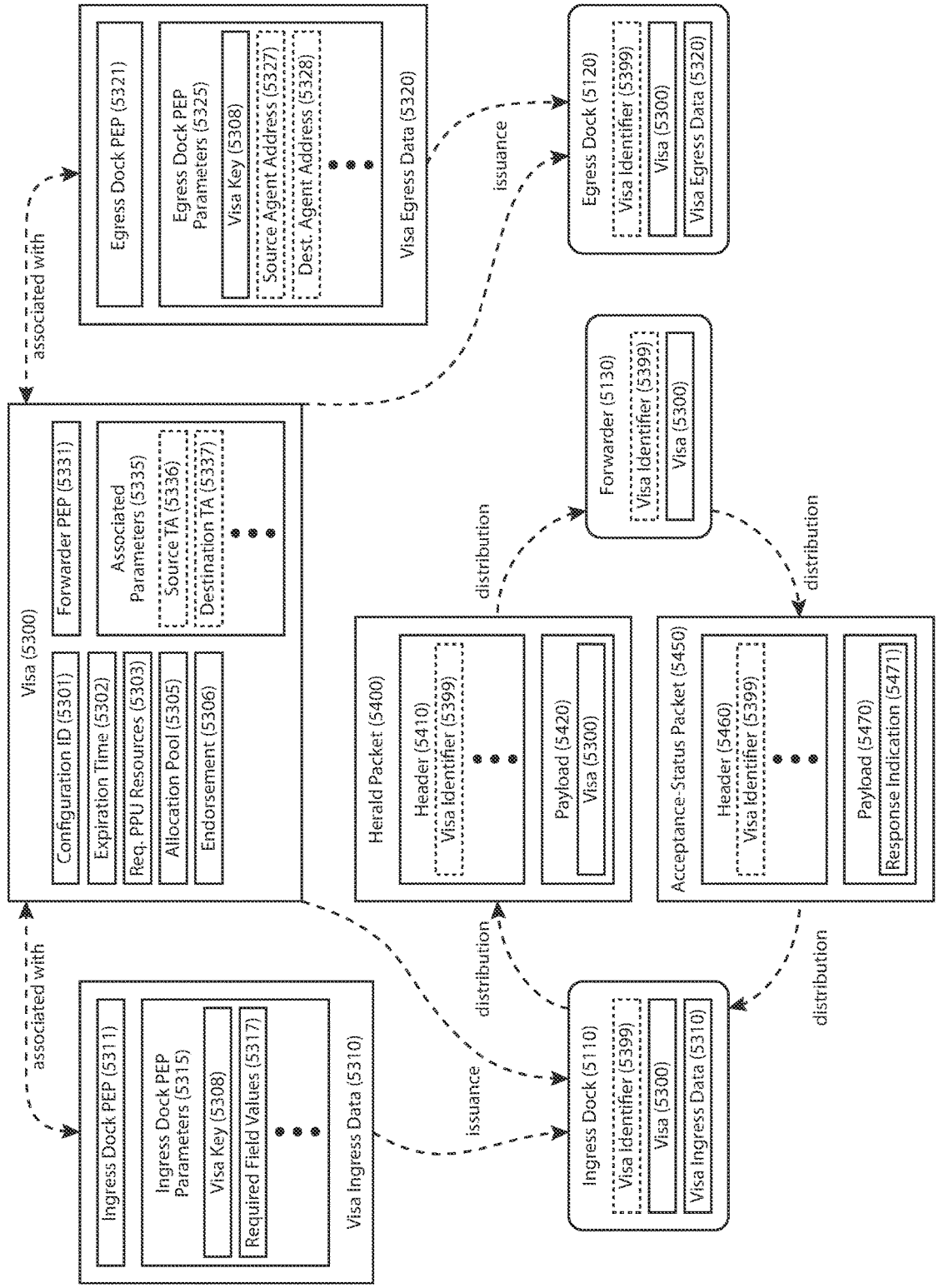
FIG. 5 shows the information within a visa, the information associated with a visa, and how the information is issued and distributed to PPUs within a SNN, in accordance with an embodiment of the present disclosure.

FIG. 5 shows the information within a visa, the information associated with a visa, and how the information is issued and distributed to PPUs within a SNN, in accordance with an embodiment of the present disclosure. As described above, each internal packet is associated with a visa. The visa 5300, in turn, specifies a forwarder PEP 5331 and associated parameters 5335 that are referenced by the forwarder PEP, required PPU resources 5303 for processing packets associated with the visa, an allocation pool 5305 from which to allocate the required PPU resources, and an endorsement 5306 from the visa service. Furthermore, the visa is associated with an expiration time 5302 and a configuration, identified by its configuration ID 5301.

In effect, the visa is a certificate, endorsed by the visa service, that attests that a PPU can process an internal packet associated with the visa, to transport an agent packet that matches the required field values, in the associated configuration, by applying the forwarder PEP with the associated parameters, before the expiration time. It also attests that a PPU has permission to allocate the required PPU resources from the allocation pool in the associated configuration when the visa is accepted.

The associated parameters typically specify a destination tether address and allowances that allow a certain volume of information to be sent at specified QOSs in a certain time period. Unless it is otherwise specified, that time period is the period during which the visa is valid, that is, from when it is issued until its expiration time. Alternatively, the associated parameters may specify a different time period during which the volume of information to be sent is measured and according to which it is limited.

In some embodiments of the invention, the visa service generates the endorsement by generating one or more cryptographic signatures signing the rest of the information in the visa. Such an endorsement can be validated by using the public key or keys of the visa server. In some embodiments, the visa may also specify a visa identifier that is uniquely associated with the visa, and an internal packet may specify this visa identifier to establish an association with the visa. In some embodiments, the expiration time may be a special time value, called never, that specifies that the visa never expires. The SNN may limit the volume of packets delivered associated with any such visa.

The required PPU resources specify the storage and any other resources in the PPU required to store the visa and process internal packets associated with the visa. Once allocated, these resources enable storage of the visa's associations with incoming and outgoing links, a hop count, any required stream number to be used as a visa identifier, and the information required to measure the rate and volume of information transmitted in association with the visa. The allocation pool specifies the pool of storage from which that required storage should be allocated.

In the preferred embodiment, the required PPU resources are specified by three numbers. The first number is the number of bits of storage that a PPU is required to allocate in association with each of the PPU's links for processing packets associated with the visa. The second number is the number of bytes of additional storage that a PPU is required to allocate for storing the visa and associated information and for processing the packets associated with the visa. The third number is the amount of processing bandwidth that is to be reserved by a PPU for use when processing packets associated with the visa. The processing bandwidth limit may be used to limit the rate of information transmitted over links under the permission of the visa.

Each visa also has associated visa ingress data 5310 and visa egress data 5320. The visa ingress data specifies an ingress dock PEP 5311 and associated parameters 5315 for converting an agent packet to an internal packet, including a visa key 5308 and required field values 5317. The required field values are a set of field-and-value pairs, specifying what values may be in which fields of an agent packet for the visa to be applicable to the agent packet. The visa egress data specifies an egress dock PEP 5321 and associated parameters 5325 for converting an internal packet to an agent packet, including a visa key 5308, and any additional information required to reconstruct the agent packet from the information in the internal packet. In the preferred embodiment, this additional information includes the source agent address 5327 and destination agent address 5328, and may facilitate translation to or from a redirect address.

Preferably, visas are uni-directional, so that a visa allowing transmission of a packet from a source tether address to a destination tether address is not the same as the visa that allows transmission of a packet from the destination tether address to the source tether address.

Alternatively, visas may be bi-directional, in which case packets are also associated with a direction of flow, and visas may be distributed in association with a direction of flow. The direction of flow associated with a packet may be determined, for example, from a visa identifier that is different for each direction of flow, from the stream through which the internal packet was received, or from an additional field in the internal packet header that indicates the direction of flow. A forwarding PEP may use the packet's associated direction of flow in determining how to process the packet. Different directions of flow may be specified in the visa ingress data and visa egress data associated with a bi-directional visa.

Issuing and Revoking Visas

Before a dock converts an agent packet to a transit packet associated with a visa, it may obtain an applicable visa from the visa service that allows transmission of transit packets to the destination tether address associated with the destination address of the agent packet. It may also obtain the visa ingress data associated with that visa, including an initial visa key.

To request a visa, the dock communicates with the visa service over its reliable, secure channel to the visa service, using the active configuration's visa-service protocol. A request for a new visa includes the header information of the incoming agent packet for which the visa is requested and the tether address of the tether through which the agent packet entered the SNN. Upon receiving a request for a new visa, the visa service records that an agent using the agent address specified in the source agent address of the header can be contacted at the tether address. It then attempts to determine the destination tether address corresponding to the specified destination agent address. If no destination tether address can be determined, the visa service does not issue a visa and the visa service informs the dock that the visa is refused.

If the visa service successfully determines a destination tether address, it attempts to determine the identity of the source and destination agents. This may require determining the identity of the agents through their adaptors using SNIP. After determining the identity of the addressed agents, the visa service attempts to identify communication policies of the active configuration that would allow those agents to communicate. This may require attempts to authenticate attributes of agent identities as required by those policies. If the visa service can find no policies that would allow the addressed agents to communicate, the visa service does not issue a visa and the visa service informs the dock that the visa is refused. If the visa service finds an applicable policy, it issues the visa.

Upon attempting to authenticate attributes of agent identities, if there are multiple candidate sets of attributes that may satisfy the policies, the visa service attempts to verify the candidate sets sequentially. Preferably the visa service begins with the candidate sets that are more likely to succeed and include attributes that are already authenticated or can be authenticated without interaction with a person. Once the visa service succeeds in authenticating a set of attributes that satisfies the policies, it need not consider other possibly valid sets of attributes to issue the visa. If the visa service cannot authenticate an acceptable set of identity attributes or for some other reason cannot issue a valid visa, it informs the dock accordingly, and no visa is generated.

The visa service determines the expiration time for the visa based on the earlier of (a) the earliest expiration time of the authentications on which the issuance is based and (b) the expiration time implied by the maximum duration time specified in the communication policies. Once the visa service has determined the expiration time of the visa, it is able to determine the maximum duration that the visa is valid from the time that it is issued. The visa services uses this maximum duration, in conjunction with the bandwidth limits set by the communication policies and the volume of the information that may have already been sent by the agent under previous visas at each QOS, to calculate the maximum volume of information that the visa should be allowed to transmit at each QOS during the period of validity. It specifies these maximum volumes as allowances in the associated parameters. In calculating the volume of the information that may have already been sent by the agent under previously issued visas at each QOS, it adds the volumes reported by the egress docks associated with the previously issued visas to the maximum volume that may yet be sent under previously issued visas that have not yet expired. In some instances, this may result in the visa service delaying the issuance of a new visa until a previous visa expires and the actual volume is reported by the egress dock associated with the previously issued visa.

To issue a visa, the visa service generates a visa endorsement, for example by cryptographically signing the visa with its private key or keys. It also generates the associated visa ingress data and visa egress data. It then communicates the visa and visa ingress data by a reliable, secure channel to the ingress dock and communicates visa egress data by a reliable, secure channel to the egress dock, and the visa is issued. As shown in FIG. 5, upon receipt of the visa, the ingress dock 5110 stores the visa 5300 and the visa ingress data 5310 in association with a visa identifier 5399 associated with a visa. Similarly, the egress dock 5120 stores the visa 5300 and the visa egress data 5320 in association with the visa identifier 5399.

Preferably, upon issuing a uni-directional visa, the visa service also issues a second visa enabling communication from the destination tether address to the source tether address. If the visa service cannot issue this second visa, policies may require that it revoke the first visa, as described later, before its expiration time.

The visa key can be used in a variety of methods to ensure the security of information transmitted between the ingress dock and egress dock. For example, the initial visa key may be used until the visa expires, as the key that encrypts information at the ingress dock and decrypts information at the egress dock. Alternatively, the visa key may be updated by the server at regular intervals or established between the sending and receiving docks through a technique of establishing a shared secret known in the art. For example, the visa key may be updated using additional internal packet types to implement a Diffie-Hellman key exchange. In an alternative embodiment, the initial visa key is a private key that has a corresponding public key which is included in the visa. This public key can then be used to check the validity of the packet each time it is received by a PPU with access to the public key.

The visa service maintains state information about the identity, tether address, and the authentication status of the identity attributes of each agent using the SNN. The state information about the authentication status of the identity attributes of an agent indicates if, how, and when those attributes were authenticated. When an authentication attempt of an identity attribute is unsuccessful, the authentication status of the identity attribute may be updated to reflect the time and method of failure.

When possible, the visa service determines agent identities and authenticates agent identity attributes based on its state information. When such information is not available or has expired, the visa service authenticates the identity attributes of the source and destination agents by interacting with their adaptors or authentication services. To interact with an agent via an adaptor, the visa service preferably uses its reliable, secure channel to the adaptor's dock to communicate using the visa-service protocol. Interactions with the dock through this protocol cause the dock to interact with the adaptor using the SNIP protocol. Thus, the dock can assist in the authentication exchange between that visa service and the adaptor through which the agent is connected to the SNN. Failed authentication attempts are reported as specified by the reporting policies.

When the authentication expires, as specified by the authentication policies, or when it is invalidated, the authentication status is updated to indicate that attribute is no longer authenticated. It is invalidated, for example, if any of the credentials used to authenticate the identity of a tethered agent cease to be honored or if an authentication service retracts a certification. The authentication policies may also cause it to be invalidated for other reasons, such as a change in the state of the trust determined by a trust evaluation service.

The visa service keeps track of all docks to which it has issued a visa. The visa service may send these docks a new visa to replace a visa due to expire soon. If a visa becomes invalidated, for example, because an authentication that it has relied upon to issue the visa is invalidated, the visa service revokes the visa by sending a revocation to all docks to which it has issued the visa. A revocation may be endorsed in a manner similar to the manner in which a visa is endorsed. The revocation specifies the visa being revoked, for example by indicating the visa's prior endorsement.

Packet Formats

As noted above, the SNN processes at least two types of packets: agent packets that enter the network at a dock, and internal packets transmitted between PPUs across links.

An internal packet includes a header and a payload. The header includes a packet type and preferably includes a visa identifier. The header also includes any other additional fields associated with the packet type. Each internal packet has a single associated visa. The visa identifier, preferably included in the header, specifies the packet's visa. That visa is associated with a configuration and that configuration is associated with the packet through the visa.

A SNN supports several types of internal packets, including transit packets, herald packets, and, optionally, acceptance-status packets. Each carries a different type of payload. A transit packet carries an additional field in its header storing a message authentication code (MAC) ensuring the integrity of the packet. A variety of MACs well-known in the art may be utilized. For example, the MAC may be an encrypted packet checksum. The header of a herald packet also contains an additional field called its hop count and an additional field indicating whether it specifies a distribution or retraction. The payload of a herald packet contains endorsed information from the visa service, either the visa being distributed or the revocation of a visa.

Figure 6:
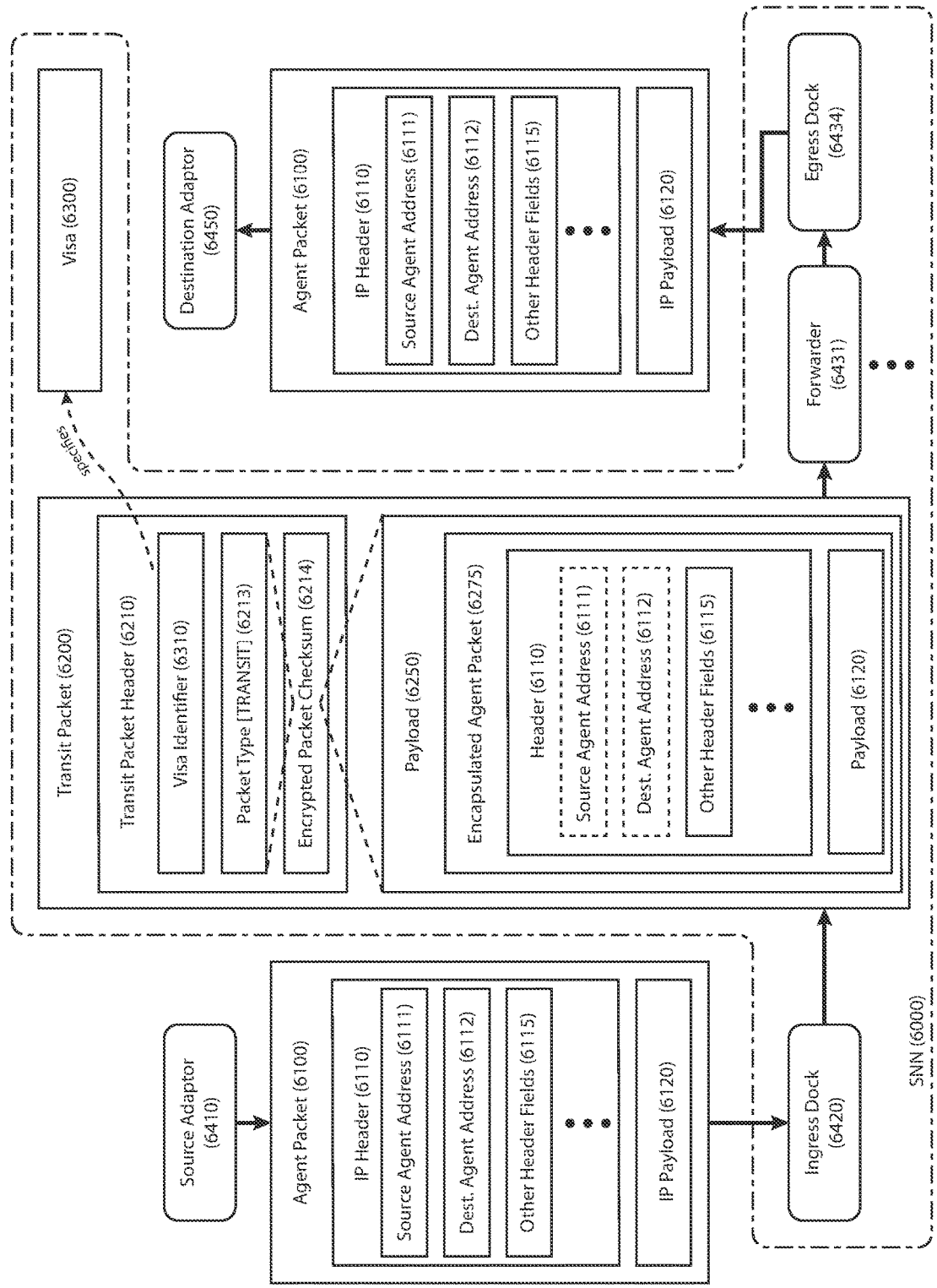
FIG. 6 shows an ingress dock converting an agent packet received from an adaptor into a transit packet for transmission through a SNN and subsequent conversion to an agent packet by an egress dock, in accordance with an embodiment of the present disclosure.

FIG. 6 shows an ingress dock converting an agent packet received from an adaptor into a transit packet for transmission through a SNN and subsequent conversion to an agent packet by an egress dock, in accordance with an embodiment of the present disclosure. The ingress dock 6420 receives the agent packet upon entry into the SNN 6000 through a tie-in from a source adaptor 6410. In the preferred embodiment of the invention, the agent packet 6100 is an IP packet with an IP header 6110 and IP payload 6120. The IP header includes a source agent address 6111, includes a destination agent address 6112, and may include other header fields 6115. The ingress dock converts the agent packet to a transit packet 6200. As described above, the transit packet header 6210 includes a packet type 6213 and preferably includes a visa identifier 6310 that specifies the visa 6300 associated with the transit packet.

The transit packet carries an encapsulated agent packet 6275 in its payload 6250 which, in combination with the associated visa's visa egress data, is sufficient to reconstruct the agent packet. In some embodiments, the encapsulated agent packet carries the entire agent packet. In other embodiments, fields of the agent packet that have required field values in the packet's visa are not included in the encapsulated agent packet and are instead reconstructed from the visa egress data associated with the packet's visa when the packet reaches its egress dock. The payload also does not need to include fields, such as an IPv6 hop count field or IPv4 time-to-live (TTL) field, that can be replaced before leaving the SNN. In the preferred embodiment, the source 6111 and destination 6112 agent addresses of the agent packet are required field values, and they are not included in the encapsulated agent packet carried in the payload, since they can be reconstructed from the associated visa's visa egress data.

The ingress dock and egress dock use the method of encrypting information between them to allow the egress dock to verify that a packet was transmitted by the ingress dock and was not altered during transmission. For example, as shown in FIG. 6, the transit packet header may also include an encrypted packet checksum 6214. Preferably, the encrypted packet checksum is a checksum encrypted by the visa key associated with the packet's visa. As shown by the dashed lines of FIG. 6, the checksum is preferably computed on all fields of the packet except the visa identifier and the encrypted packet checksum. The checksum is not computed on the visa identifier because, in some embodiments, the visa identifier can potentially change each time the packet is transmitted. The method of encrypting information can also serve to conceal the payload of transit packets from forwarders that process the transit packet.

The ingress dock transmits the transit packet through the link to its forwarder 6431. The transit packet may be transmitted through other links to other forwarders before arriving at the egress dock 6434. The egress dock converts the transit packet back to the agent packet 6100 using the encapsulated agent packet and the visa egress data. Finally, the egress dock transmits the agent packet to the destination adaptor 6450.

Returning to FIG. 5, the payload of a herald packet 5400 contains information for a visa being either distributed or retracted. In the former case, which is illustrated in the figure, the part of the packet's visa carried by the packet contains all the information in the packet's visa that is required by forwarders to process packets associated with the visa. In the preferred embodiment shown in FIG. 5, the header 5410 of the herald packet contains the visa identifier 5399 and the payload 5420 of the herald packet contains the entire visa 5300. The hop count in the herald packet's header (not shown) indicates the maximum number of times the information in the payload should be forwarded.

Also as shown in FIG. 5, in some embodiments, an acceptance-status packet 5450 may carry a response indication 5471 in its payload 5470 that indicates whether the transmitting PPU (a forwarder 5130 in FIG. 5) accepts, re-accepts, de-accepts, or refuses the associated visa. If the transmitting PPU accepts the visa, it stores the visa 5300 in association with the visa identifier 5399 associated with the visa. A response indication in an acceptance-status packet may also be used to acknowledge the retraction of a visa. The payload may also indicate the reason for a de-acceptance or refusal. Other acceptance-status payloads may be used to perform a handshake confirming that acceptance-status packets are transmitted reliably over a link, using methods known in the art.

Traditionally, the fields in a packet format are either fixed by the protocol or specified by other fixed-length fields which specify the length of the variable-length fields. Fixing field lengths at the time of protocol definition is inflexible and implementing variable-length fields requires extra runtime overhead. To address these deficiencies, internal packet formats may vary from configuration to configuration. Since internal packets never leave the SNN, each configuration can use a format that is advantageous for that configuration, provided that packets traveling though the SNN at the same time but using a different size or position for the visa identifier can be distinguished. In the preferred embodiment, the first byte of the internal packet header is used to specify the packet type and packet format, and the next bytes are used to specify the visa identifier. The number of bytes used to specify the visa identifier is defined by the configuration.

In some embodiments of the invention, configurations may use multiple types of transit packets for carrying multiple types of agent packets. Configurations may also define other packet types, such as packets for establishing shared secrets or packets for carrying an encrypted internal packet within their payload. The preferred embodiment of the invention, however, uses only the three required packet types.

Visa Identifiers and Serial Numbers

Every internal packet is associated with a visa, either explicitly by a visa identifier, that is preferably in the packet header, or by association with the stream through which the packet is transmitted.

In the preferred embodiment, the visa identifier is a stream number, indicating the incoming link stream that the packet has been received on or the outgoing link stream that the visa is transmitted on. In this embodiment, a forwarder may change the visa identifier of a packet header before transmitting it through a link.

In other embodiments of the invention, the visa service generates a visa serial number to either supplement the visa identifier or serve as the visa identifier. The visa service may generate visa serial numbers unpredictably from a space of possible visa serial numbers that is much larger than the number of valid visas in the SNN at any given time, making it difficult to forge a visa serial number that corresponds to a valid visa. This may be accomplished by using a pseudorandom number generated by a cryptographically strong random number generator as all or part of a visa identifier, or by using a number derived from the visa endorsement as the visa serial number.

In another embodiment, the visa identifier contains all of the information in the visa. An advantage of this method is that the information in the visa identifier does not need to be distributed to forwarders by other methods.

In yet another embodiment, the visa identifier is not explicitly included in the internal packet header but is inferred from the stream through which the packet is transmitted. In this embodiment some approach other than referencing the visa identifier is utilized to differentiate the streams within a link. For example, docks may encapsulate internal packets within other packet types with stream numbers, or PPUs may use different wavelengths of light for different streams on a fiber optic connection. As in the preferred embodiment, the visa identifier may be changed on the packet before transmitting it through a link, but in this embodiment that does not require changing the packet header.

Distributing and Retracting Visas Along Paths

An ingress dock processes an agent packet by associating it with a visa and applying the dock PEP and associated parameters specified by the visa ingress data associated with that visa. This either causes the agent packet to be discarded or converted into an internal packet associated with the visa and transmitted on the PPU's links. This may require requesting a new visa from the visa service. A dock processes a transit packet as specified by the visa egress data associated with the packet's visa to convert it to an agent packet.

A forwarder processes an internal packet as specified by the visa associated with the packet. The forwarder PEP and associated parameters specify a method to either discard the packet or transmit it on a link. The forwarder may use this method to both transmit transit packets and distribute visas with herald packets.

Visas may be pre-issued and distributed as part of a configuration or issued at the request of an ingress dock, in which case the visa must be distributed before the internal packet is transmitted by the ingress dock to the associated forwarder. In either case, the visa is distributed to the PPUs that require it. Similarly, when a visa is revoked, it is retracted from the PPUs to which it was distributed and by which it was accepted.

Generally, distribution requires that the visa be distributed to a sequence of linked PPUs comprising a potential path of the compliant flow, through the SNN, with which the visa is associated. Similarly, retraction of a visa entails retracting the visa from the PPUs along the path.

Figure 15:
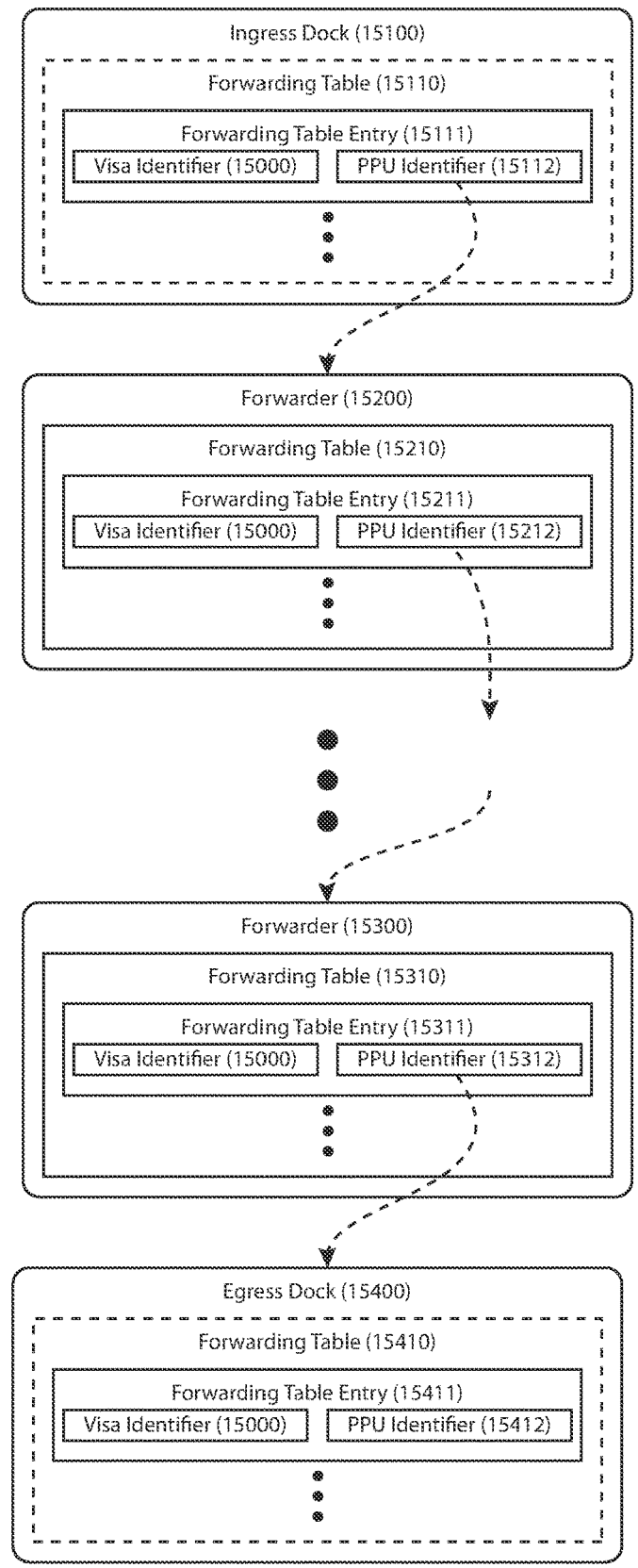
FIG. 15 shows a path of PPUs through a SNN, in accordance with an embodiment of the present disclosure.

FIG. 15 shows a path of PPUs through a SNN, in accordance with an embodiment of the present disclosure. The path of FIG. 15 comprises an ingress dock 15100, several forwarders 15200 and 15300, and an egress dock 15400. Preferably, a path is recorded by a sequence of entries in the forwarding tables 15110, 15210, 15310, and 15410 of the PPUs along the path. Specifically, the entry 15111, 15211, 15311, and 15411 in the table of a PPU in the path associates the visa with the next PPU along the path. Preferably, the forwarding table entry includes the visa identifier 15000 and a PPU identifier 15112, 15212, 15312, and 15412 such as the PPU number. The forwarding table entry may additionally include one or more alternate PPU identifiers specifying PPUs to which packets may be transmitted should transmission to the PPU specified by the primary forwarding table entry fail.

Note that while the forwarding tables 15110 and 15410 of the ingress dock and egress dock are shown in FIG. 15, in many embodiments of the invention, including the preferred embodiment, they may be omitted. Because the ingress dock is connected to exactly one forwarder, the next PPU along the path is unambiguous, and need not be stored in a forwarding table. Correspondingly, because the egress dock is the last PPU along the path, it need not store a next PPU.

Instead, as described above, the egress dock can reconstruct an agent packet for delivery to an agent based on the visa egress data.

A SNS may use one or more of several approaches to distributing visa to the PPUs along a path. In one approach, the visa is distributed directly from the visa service to each on-path PPU via a secure channel, and the visa service informs each on-path PPU of the identity of next on-path PPU. The on-path PPU then stores an identifier of the next on-path PPU, in a forwarding table. For example, the visa service may inform the on-path PPU of the PPU number of the next on-path PPU and the on-path PPU may store the PPU number in the forwarding table. Preferably, the on-path PPU and the next on-path PPU establish a visa identifier with which they may reference the visa, preferably via exchange of internal packets, specifically a herald packet or a sequence of related herald packets. In one variation of this approach, the on-path PPU and next on-path PPU may reference the visa based on a stream number, as described above. Once the visa identifier is established, the on-path PPU stores the established identifier in its forwarding table, in association with the identifier of the next on-path PPU. In those embodiments where the visa also has a visa serial number, the on-path PPU and next on-path PPU also store an association between the visa serial number and the established visa identifier.

In a second approach to distributing visas along a path, the visa service initially issues the visa to a first on-path PPU along the path via a secure channel. For example, the visa service may issue the visa to the dock at which an agent connects to the SNN. The first on-path PPU distributes the visa to the next on-path PPU. Preferably, the visa is distributed within one or more internal packets, specifically a herald packet or a sequence of related herald packets, as shown in FIG. 5. Preferably, the first on-path PPU and the next on-path PPU establish a visa identifier with which they may reference the visa, for example a stream number as described above. Once the visa identifier is established, the first on-path PPU stores the established identifier in its forwarding table, in association with the identifier of the next on-path PPU. This process is repeated for each adjacent pair of PPUs along the path. In this manner, the visa reaches each on-path PPU, and each on-path PPU stores the information in its forwarding table required for subsequent transmission of packets along the path under the visa. In those embodiments where the visa also has a visa serial number, each on-path PPU also stores an association between the visa serial number and the established visa identifier.

In a third approach, like the second approach, the visa service initially issues the visa only to a first on-path PPU, for example a dock, via a secure channel. The visa service also informs the first on-path PPU of the next on-path PPU along the path, after which the first on-path PPU distributes the visa to the next on-path PPU. Preferably, the visa is distributed within one or more internal packets, specifically a herald packet or a sequence of related herald packets. The first on-path PPU and the next on-path PPU establish a visa identifier with which they may reference the visa, for example a stream number as described above. One the visa identifier is established, the first on-path PPU stores the established identifier in its forwarding table, in association with the PPU identifier of the next on-path PPU.

Upon distribution of the visa from the first on-path PPU to the next on-path PPU, the next on-path PPU contacts the visa service. The visa service informs the next on-path PPU of an after-next on-path PPU, and the above process is repeated. Specifically, the next on-path PPU distributes the visa to the after-next on-path PPU, after which the next on-path and after-next on-path PPUs establish another visa identifier, and the next on-path PPU stores the established identifier in its forwarding table, in association with the PPU identifier of the after-next on-path PPU.

In this manner, the visa is distributed to each on-path PPU, and each on-path PPU stores the information in its forwarding table required for subsequent transmission of packets along the path under the visa. In those embodiments where the visa also has a visa serial number, each on-path PPU also stores an association between the visa serial number and the established visa identifier.

Upon receiving a visa via a herald packet, as illustrated in FIG. 5, a PPU can accept the visa or, if it has already been accepted, for example through another link, re-accept it. It can refuse the visa, for example, if it does not have resources available to accept it. It can de-accept a visa on a link on which it was already accepted or re-accepted. It may do so, for example, if the visa fails to distribute to the egress dock. A visa may be retracted by a herald packet with a value in an additional header field that indicates retraction of the visa specified by a revocation in the payload of the herald packet.

A PPU preferably ensures that a visa is accepted by a linked PPU before it transmits a transit packet with that visa to that linked PPU. Also, a PPU preferably prevents a herald packet from being transmitted more times than the maximum allowed path length of the configuration. For example, when a dock receives a visa from the visa service, it may associate the visa with a hop count equal to the active configuration's maximum allowed path length. When a PPU receives a visa via a herald packet, it may associate the visa with the hop count specified in the header of the herald packet.

A PPU may also retract a visa that has been distributed from all the PPUs which it caused the visa to be distributed to. Finally, a PPU may also determine if a visa has been successfully distributed or retracted.

Dock and Forwarder Operation

One skilled in the art will appreciate that the above-described functionality can be implemented in a number of different embodiments. The behavior of PPUs in one such implementation is shown in FIG. 7 through FIG. 11 and described in detail below.

Figure 7:
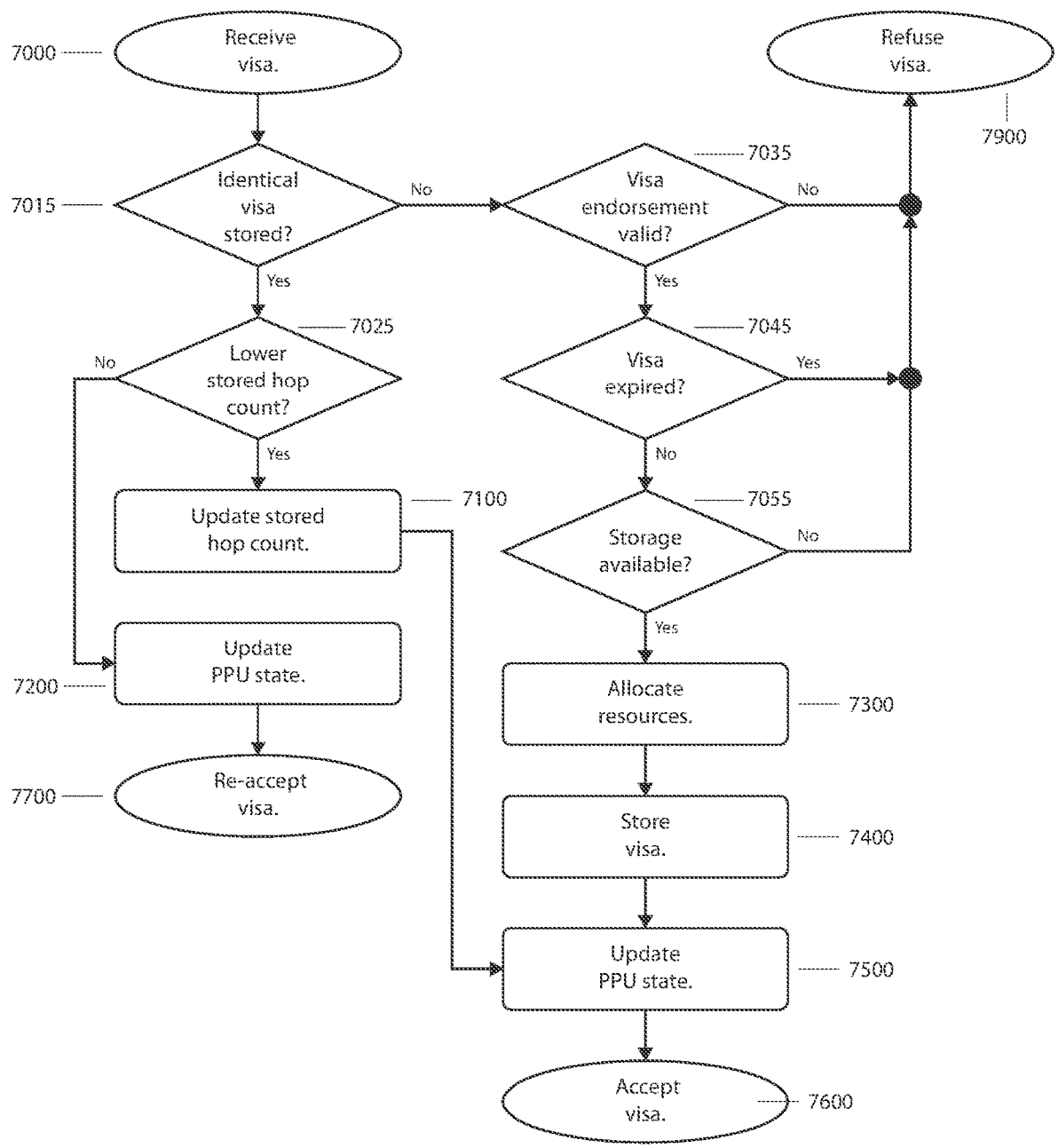
FIG. 7 shows a flow chart summarizing the behavior of a PPU upon receiving a visa in a herald packet, in accordance with an embodiment of the present disclosure.

FIG. 7 shows a flow chart summarizing the behavior of a PPU upon receiving a visa in a herald packet, in accordance with an embodiment of the present disclosure. When the PPU receives a visa 7000 via a herald packet, it attempts to accept the received visa. The PPU first determines 7015 if the received visa is identical to a visa that was previously stored. If not, the PPU determines if the visa is valid by checking 7035 the visa's endorsement and checking 7045 the visa's expiration time. If the visa is not valid it refuses 7900 the visa. If the visa is valid, the PPU checks 7055 if it has sufficient storage to allocate the required PPU resources specified in the visa from the allocation pool specified in the visa. If it is unable to do so, it refuses 7900 the visa. If it is able to do so, it allocates the specified resources 7300, stores the visa 7400, and updates its PPU state 7500. To update its PPU state, the PPU associates the visa with the hop count specified in the header and any visa ingress data or visa egress data associated with the visa. It also associates the newly stored visa with any link stream on which the visa arrived. Finally, the PPU accepts 7600 the visa.

If the received visa is identical to a visa that was previously stored, the PPU checks 7025 if the hop count specified in the header of the herald packet is lower than the hop count associated with the visa in the PPU state. If not, the PPU updates 7200 its PPU state, including associating the stored visa with any link stream on which the received visa arrived, and re-accepts 7700 the visa. If the hop count associated with the stored visa is lower than the hop count specified in the received herald packet, the PPU updates 7100 the hop count associated with the stored visa to the higher hop count. The PPU then updates the PPU state 7500 including associating the stored visa with any link stream on which the visa arrived and accepts 7600 the visa.

In an alternative embodiment, a PPU does not fully accept the visa until the visa has been successfully distributed to an egress dock.

A PPU ceases to store a visa when it expires, when its endorsement is discovered to be invalid, when it is retracted, or when its associated configuration is deactivated. Whenever a PPU ceases to store a visa, it de-allocates any PPU resources that were allocated for that visa.

Visa distribution may be initiated by an ingress dock that has accepted a visa issued by the visa service. The ingress dock distributes the visa to an initial sequence of PPUs that can transmit packets associated with the visa to their destination. Visa distribution may also be initiated by a forwarder to distribute the visa to a new sequence of PPUs that can transmit such packets to their destination.

By decrementing the herald packet's hop count each time it is forwarded, the length of these potential paths can be limited, for example, to the maximum allowed path length of the associated configuration. An advantage of this method is that transit packets do not require a hop count field that is changed each time the packet is forwarded.

Acceptance-status packets may be transmitted when a visa is accepted, re-accepted, de-accepted, refused, or retracted. An acceptance-status packet is sent back to the PPU that transmitted the herald packet to which it is responding, on the same link on which the herald packet was received, and with the same visa identifier as the herald packet. Acceptance-status packets specify in their payload whether the packet indicates the acceptance, re-acceptance, de-acceptance or refusal of a visa or the acknowledgement of a retraction.

In the case where links are not reliable channels, methods familiar in the art may make use of unencrypted packet checksums, timeouts, retransmission, and additional packet types to ensure the reliable transport of herald packets and acceptance-status packets across a link.

Figure 8:
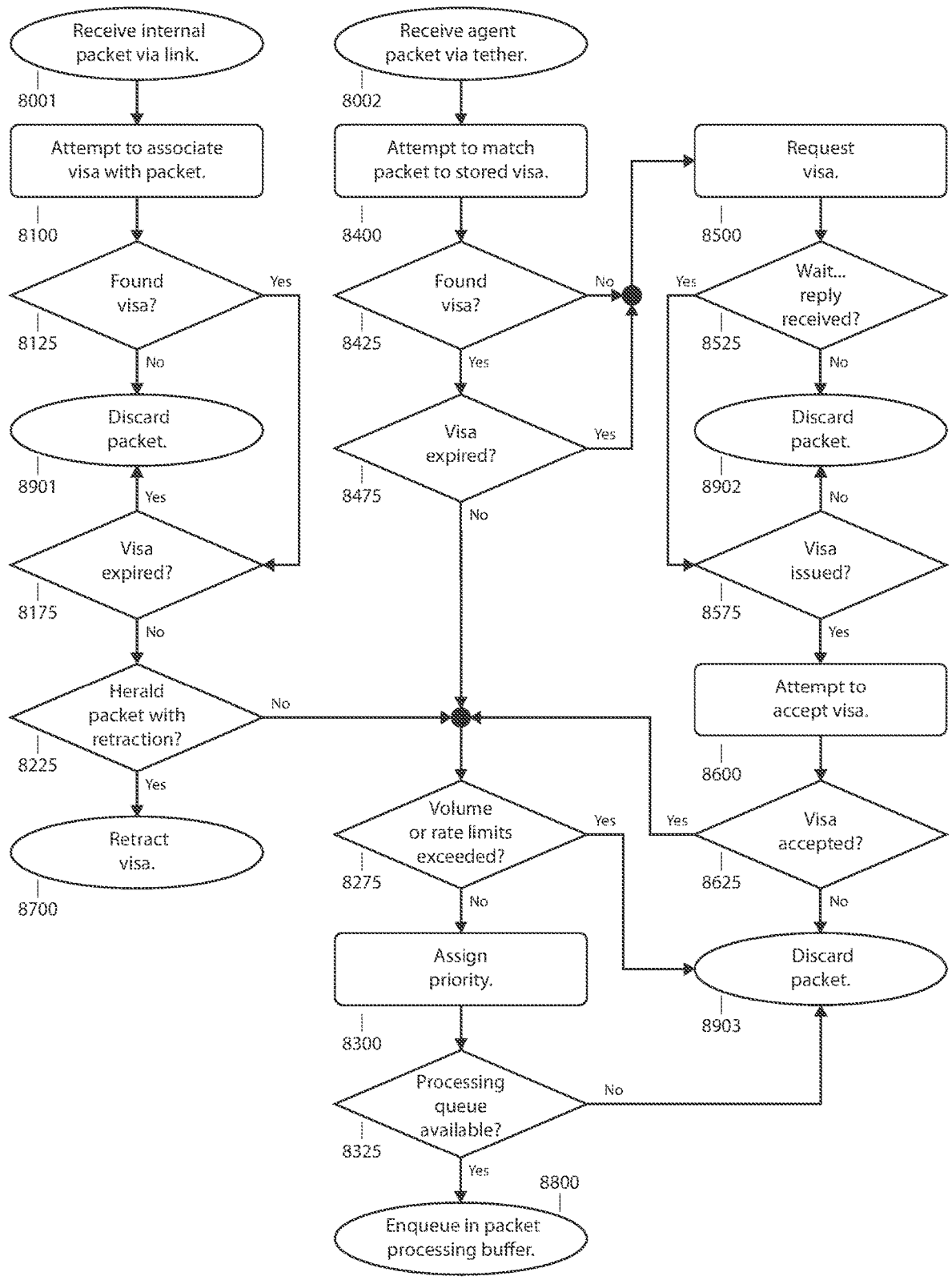
FIG. 8 shows a flow chart summarizing the behavior of a PPU upon receiving an agent packet through a tether or an internal packet through a link, in accordance with an embodiment of the present disclosure.

FIG. 8 shows a flow chart summarizing the behavior of a PPU upon receiving an agent packet through a tether or an internal packet through a link, in accordance with an embodiment of the present disclosure. When a PPU receives a packet, it attempts to associate the packet with a visa. If the packet is not discarded it processes the packet, and if the packet is still not discarded it attempts to transmit the packet. If a PPU discards the packet it reports the discard as required by the policies of the currently active configuration. The method used by PPUs to perform these steps depends on whether the packet is an agent packet or an internal packet.

Only docks receive 8002 agent packets via a tether. A dock attempts to associate a received agent packet with a visa by attempting to match 8400 the agent packet to a stored visa in the dock state. It determines if a visa matches an agent packet by checking if the field values in the header of the agent packet match the required field values of the visa. If 8425 it finds a matching visa in the dock state, it checks 8475 if the visa is expired. If this visa has not expired, it is an applicable visa. If 8425 the dock does not find an applicable visa in the dock state, it requests 8500 a new visa from the visa service, specifying in the request the header information of the incoming agent packet and the tether address of the tether on which the agent packet was received. It then waits 8525 for a response from the visa service. If no response is received or if 8575 the visa service refuses to issue a new visa it discards 8902 the agent packet. If 8575 the visa service does issue a visa the dock attempts 8600 to accept the visa. If 8625 the dock does not succeed in accepting the visa, it discards 8903 the agent packet. If 8625 the dock does succeed in accepting the visa, the visa is an applicable visa. If the dock is able to find an applicable visa for the received agent packet, it associates the agent packet with that visa and attempts to add the packet to its agent packet processing buffer.

A PPU receiving 8001 an internal packet via a link may be a dock or a forwarder. The PPU attempts 8100 to associate an internal packet with a visa by finding in the PPU state an unexpired visa associated with either the visa identifier or the incoming link stream on which the packet arrived. If 8125 no such visa is in the PPU state, the PPU discards 8901 the packet. If 8125 the PPU successfully finds and associates a visa with the internal packet, it checks 8175 if the visa is expired. If so, it discards 8901 the packet. If not, if the packet is an acceptance-status packet and the PPU is waiting for a response on the link stream on which the packet arrived, then (not shown) the PPU may use the response indication of the acceptance-status packet to update the acceptance status associated with the link on which the packet arrived. Whether or not it was waiting for such a response, it then discards the acceptance-status packet. If 8225 the packet is a herald packet and the additional header field indicates retraction of the visa, it retracts 8700 the visa. Otherwise it attempts to add the packet to its internal packet processing buffer.

To retract 8700 a visa, a PPU transmits the herald packet, with the additional header field indicating retraction, on every link that accepted the visa; ceases to store the visa; and changes the link state on each of those links to indicate that the visa is not accepted on those links. It may reply on the link stream on which it received the herald packet with an acceptance-status packet indicating the acceptance of the retraction.

When a PPU attempts to add a packet to a packet processing buffer, it first checks if processing the packet would exceed any volume or rate limits specified in the visa. If 8275 the packet could not be processed without exceeding these limits, the PPU discards 8903 the packet. The PPU then determines if the packet should be prioritized and assigns 8300 a corresponding priority to the packet. If the measured bandwidth of processing packets associated with the packet's visa is less than the reserved bandwidth specified in the visa, the packet is prioritized, otherwise it is not prioritized.

Finally, if 8325 a processing queue is available within the packet processing buffer, the PPU enqueues 8800 the packet in the packet processing buffer. Each packet processing buffer has two first-in-first-out queues for packets. The first queue is used for packets that are prioritized. The second queue is for packets that are not prioritized and prioritized packets when the first queue is full. When enqueuing packets in the packet processing buffer the PPU checks for an available queue. If the packet is prioritized the PPU first checks for space in the first queue; if the first queue does not have space available, it checks for space in the second queue. If the packet is not prioritized the PPU only checks for space in the second queue. If 8325 the PPU cannot find space in a queue for the packet, the PPU discards 8902 the packet. Otherwise it is added to the queue 8800 where the available space was found.

A PPU processes packets that have been added to a packet processing buffer by applying the communication PEP associated with the packet's visa. The PPU first attempts to process a packet from the first queue, and if the first queue is empty it processes a packet from the second queue, if one is available. If one is not available, it waits for a packet to be added to the packet processing buffer. When applied to a packet, the communication PEP either discards the packet or transmits the packet on a link.

In an alternative embodiment, the processing buffer uses a separate processing queue for each of several QOSs and processes all packets for the queues associated with a higher QOS before it processes packets for the queues associated with a lower QOS. In another alternative embodiment, the processing buffer uses a single processing queue and places packets associated with a higher QOS ahead of packets with a lower QOS in the queue.

Figure 9:
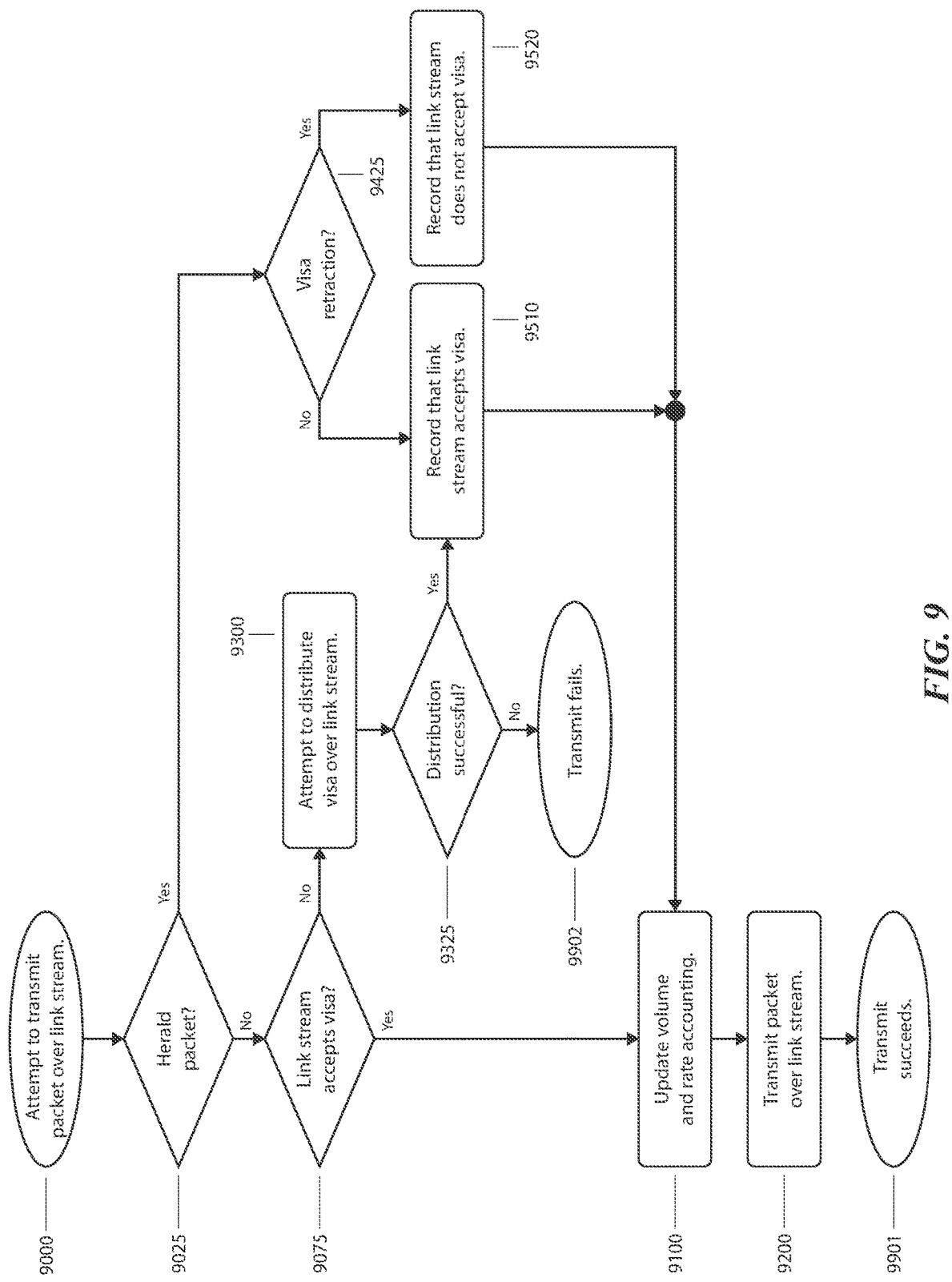
FIG. 9 shows a flow chart summarizing how a PPU attempts to transmit an internal packet over a link stream, in accordance with an embodiment of the present disclosure.

FIG. 9 shows a flow chart summarizing how a PPU attempts to transmit an internal packet over a link stream, in accordance with an embodiment of the present disclosure. If processing a packet causes a PPU to attempt 9000 to transmit an internal packet on a link stream, the PPU first checks if the packet is a herald packet. If 9025 so, the PPU checks if the additional header field indicates retraction of a visa. If 9425 so, the PPU records 9520 that the link stream associated with the visa no longer accepts the visa. If 9425 not, the PPU records 9510 that the link stream associated with the visa accepts the visa.

If 9025 the packet is not a herald packet, the PPU checks if the packet's visa has been accepted on the link stream. If 9075 not, the PPU attempts 9300 to distribute the visa over the link stream. If 9325 the attempt is not successful, transmission of the packet fails 9902. If 9325 the attempt is successful, the PPU records 9510 that the link stream associated with the visa now accepts the visa.

If 9075 the packet's visa is accepted on the link stream, or after the PPU finishes handling a herald packet, the PPU updates 9100 any applicable volume and rate measures associated with the packet's visa. The PPU then transmits 9200 the packet over the link stream, and transmission of the packet is successful 9901.

To attempt 9300 to distribute a visa on a link, the communication PEP generates a decremented hop count from the hop count associated with the visa. If that decremented hop count is zero, the attempt to distribute the visa on the link is unsuccessful. If the decremented hop count is not zero, it may allocate a stream or a stream number on the link that is associated with the visa and transmit a herald packet with the visa and the decremented hop count on the link. It may then wait for an acceptance-status packet, and if it fails to receive a response within the required time or if it receives a response indicating the linked PPU refuses the attempt to distribute a visa on the link, the attempt to distribute the visa on the link is unsuccessful. If the PPU does not wait for a response or it receives a response indicating the acceptance of the visa, the PPU records that the visa has been accepted on that link, and the attempt to distribute the visa on the link is successful.

When waiting for a response or waiting for a packet to arrive in a processing buffer the PPU may perform other tasks, and that when waiting for a response a PPU may recognize that no response is received if the response has not been received within a specified time. After receiving a response, a PPU may continue to wait for other responses.

Figure 10:
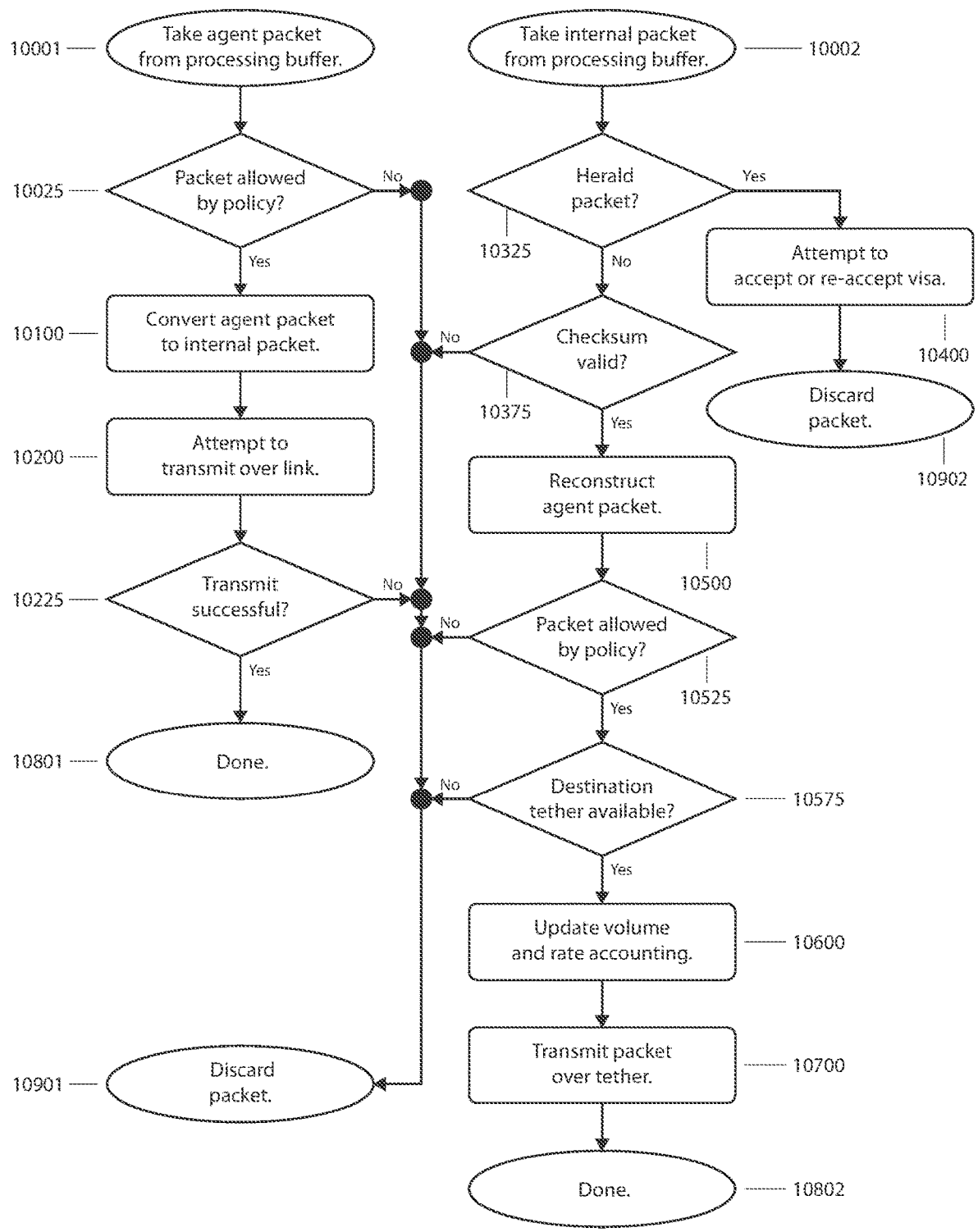
FIG. 10 shows a flow chart summarizing how a dock processes agent packets and internal packets, in accordance with an embodiment of the present disclosure.

FIG. 10 shows a flow chart summarizing how a dock processes agent packets and internal packets, in accordance with an embodiment of the present disclosure. A dock processes an agent packet by taking the packet 10001 from the agent packet processing buffer and applying to the packet the dock PEP and parameters in the visa ingress data associated with the packet's visa. The ingress dock PEP checks if the transmission of the packet is allowed by policy. If 10025 not, the ingress dock PEP discards 10901 the packet. Otherwise, the ingress dock PEP converts 10100 the agent packet into an internal packet with the visa identifier of the associated visa, payload information sufficient for the egress dock to reconstruct the agent packet from the encapsulated agent packet, and an encrypted packet checksum encrypted with the visa key in the visa ingress data. The payload may also be encrypted with the visa key in the visa ingress data. The ingress dock PEP then attempts 10200 to transmit the internal packet on the dock's link. If 10225 the attempt to transmit the packet is not successful, the ingress dock PEP discards 10901 the packet. Otherwise, execution of the ingress dock PEP is done 10801.

A dock begins processing an internal packet by taking 10002 the packet from the internal packet processing buffer and checking the type of the packet. If 10325 the packet is a herald packet it attempts 10400 to accept or re-accept the visa and then discards 10902 the packet. Optionally, the PPU can send an acceptance-status packet indicating acceptance or re-acceptance of the visa back on the link on which the herald packet was received. If the packet is not a herald packet, it is a transit packet, and the dock applies the dock PEP and parameters in the visa egress data associated with the internal packet's visa. The egress dock PEP first verifies the encrypted packet checksum using the visa key in the visa egress data. If 10375 this verification is unsuccessful it discards 10901 the packet, otherwise it reconstructs 10500 the agent packet from the encapsulated agent packet and the visa egress data. It then checks if 10525 the delivery of the packet is allowed by policy and if 10575 the tether on which the packet is to be delivered is available for transmission. If either of these conditions is not true, the egress dock PEP discards 10901 the packet. If both of these conditions are true, the egress dock PEP updates 10600 any applicable volume and rate measures associated with the packet's visa and transmits 10700 the internal packet over a tether for delivery to an adaptor. Execution of the egress dock PEP is then done 10802.

Figure 11:
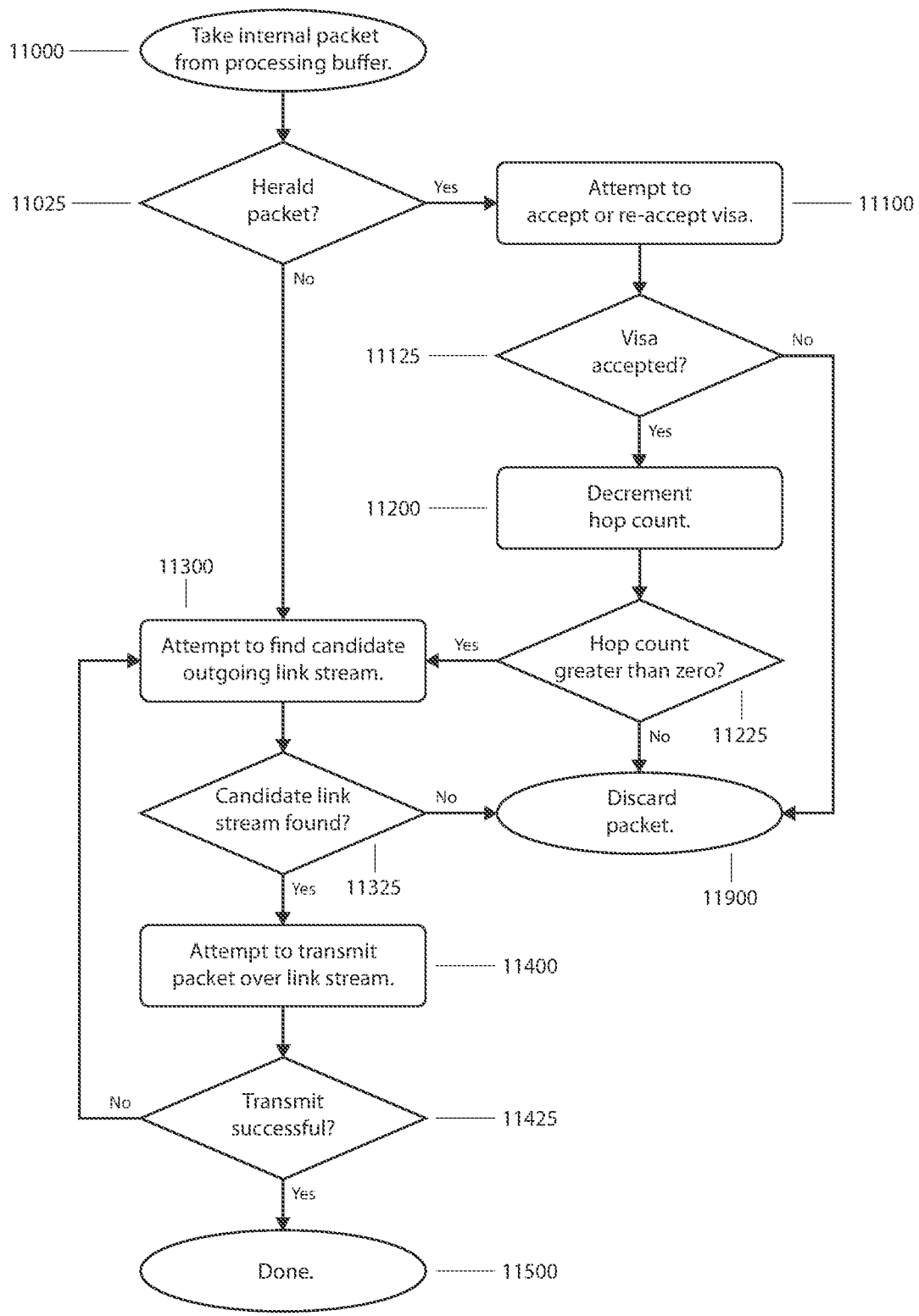
FIG. 11 shows a flow chart summarizing how a forwarder processes internal packets, in accordance with an embodiment of the present disclosure.

FIG. 11 shows a flow chart summarizing how a forwarder processes internal packets, in accordance with an embodiment of the present disclosure. A forwarder processes an internal packet by taking 11000 the packet from the packet processing buffer and applying the forwarder PEP and associated parameters specified in the packet's visa to the packet.

When applied, a forwarder PEP first checks if the packet is a herald packet. If 11025 it is a herald packet the forwarder PEP attempts 11100 to accept or re-accept the visa in the payload of the herald packet. If 11125 the attempt results in re-acceptance or refusal of the visa, the forwarder PEP discards 11900 the herald packet, and may transmit an acceptance-status packet indicating re-acceptance or refusal of the visa back on the link from which the herald packet was received. If 11125 the attempt results in the acceptance of the visa, the forwarder PEP may transmit an acceptance-status packet indicating acceptance back on the link from which the herald packet was received. The forwarder PEP then decrements 11200 the hop count, and if 11225 the decremented hop count is greater than zero it continues to process the packet, otherwise it discards 11900 the herald packet.

Next, or if 11025 the packet is not a herald packet, the executing forwarder PEP attempts 11300 to find a candidate link stream on which to forward the packet by methods familiar in the art. If 11325 it does find a link stream it can use to transmit the packet, it attempts 11400 to transmit the packet on that link stream. If the attempt to transmit is successful, execution of the forwarder PEP is done 11500. If 11425 the attempt to transmit is unsuccessful the forwarder PEP attempts 11300 to find another candidate link stream. If 11325 the forwarder PEP fails to find a candidate link stream on which it can attempt to transmit the packet, it discards 11900 the packet.

SNN Services

All internal services have secure, reliable channels to all PPUs and management services.

The visa service receives visa requests from docks and responds with issued visas or refusals. The admin service receives requests from an admin and responds to the admin with acknowledgements and other information and sends other responses to any affected PPUs and hardware units. Either service may receive reports, which are interpreted as requests to acknowledge the report, and the services may respond to the reports with acknowledgements.

Some embodiments of a SNN may use a single visa or admin server to implement the corresponding service. Other embodiments of a SNN may use multiple sub-servers to implement the visa service or admin service.

In the latter case, the SNN may allow some number of hardware units implementing the sub-servers of the visa service or admin service to fail without disabling the visa service or admin service. For example, the visa service and admin service may be implemented using k-of-n redundancy and fault tolerance methods familiar in the art.

In a first embodiment, the sub-servers establish consensus among communicating sub-servers, some of which may be compromised, using methods familiar in the art. For example, the sub-servers may implement a Byzantine consensus algorithm like that described in "Authenticated Byzantine Fault Tolerance Without Public-Key Cryptography" (MIT Technical Memo MIT/LCS/TM-589, June 1999).

Full Byzantine state replication is sufficient to implement the SNN services, but it is not required. The requirement to tolerate a compromised sub-server can be more simply accommodated by taking advantage of the specific requirements of each service.

Preferably, the admin service receives its critical state information only from the admins and receives reports only from other sources. The admin sub-servers may be independently able to decide how to act on these reports, for example in storing them and communicating them to the admins. In this case, the admin service may be implemented by three sub-servers and client elements associated with each PPU and management service. The client elements send the same information to all three sub-servers and only accept information as valid if they receive it from at least two of the three severs. They also report any disagreeing sub-server.

The visa service may be implemented by a combination of issuing sub-servers, client elements associated with each PPU, and a set of at least four state sub-servers that use Byzantine state replications methods to hold state information that is shared among the state sub-servers. This approach allows for the number of issuing sub-servers to be larger than the number of state sub-servers, which may be advantageous for load distribution.

Dock communications with the visa service are facilitated by the client elements. The client elements maintain secure, reliable connections with at least three issuing sub-servers; send all requests to three of these issuing sub-servers; and accept responses to these requests only if they receive matching replies from two sub-servers. If a client element fails to receive a matching reply from a sub-server within an expected period of time, it reports this, and may cease to use that sub-server for requests. A client element will only send a request to a dock if it receives a matching request from two issuing sub-servers. There may be other issuing sub-servers that are not involved in the transaction with the client elements.

When an issuing sub-server receives a request for a visa, it determines whether a visa should be issued based on information in the request and information obtained from the state sub-servers. If no visa should be issued, it replies with a refusal. If a visa should be issued, the issuing sub-server replies with the information, other than endorsements, that should be included in the issued visa. When the client element receives matching visa information from two issuing sub-servers the visa is issued with that information, and with a specification of the two issuing sub-servers (the endorsing servers) as the endorsement. That specification may be the agent address or derived from the agent address of each issuing sub-server, for example by removing a prefix.

Every PPU has a secure, reliable channel to each issuing sub-server for the purpose of confirming that a visa was issued by the endorsing sub-servers. This channel may be used by the PPU for asking for a confirmation from an endorsing sub-server. Alternatively it may be used by an endorsing sub-server to send this confirmation in advance to all PPUs to which the visa may be distributed. In either case, the client element requires confirmation from two endorsing sub-servers to confirm that the visa is valid. The request or distribution of the confirmation may include all of the information in the visa other than the endorsements, or alternatively a cryptographic hash of this information. The method of pre-sending the confirmation may be combined with the method of requesting the confirmation, allowing PPUs to store only a limited number of pre-sent confirmations in a first-in-first-out buffer, using the buffered information when it is available and requesting new confirmations when it is not. It may be advantageous to send the confirmation of the pair of visas that enable communication for both directions of a compliant flow in the same message.

As noted above, SNN services can receive reports from PPUs or management services. When a reporter sends such a report, it sends the request to at least two sub-servers of the service through a secure, reliable channel and it only accepts the acknowledgement of the report when it has received a matching response from at least two sub-servers on these same channels. If it does not receive matching responses within a maximum waiting period, it may send the report to additional sub-servers. It may also report the failure to receive a matching response as a separate report.

In a second embodiment, SNN services are implemented by multiple sub-servers, each sub-server on a different hardware unit, without requiring consensus among communicating sub-servers. Instead, the PPUs and management services that act on information issued by the visa service or admin service verify that the information has been endorsed by at least two sub-servers before acting on the information. While the endorsement of the at least two sub-servers can be coordinated by a single responding sub-server, as described below, the PPUs and management services send requests for this information to at least two sub-servers, so that the service operates correctly even if one of the sub-servers fails to report the endorsement of the other sub-servers Similar methods can be applied to require the endorsement of k-of-n sub-servers.

In the second embodiment, each of the hardware units implementing a visa service sub-server has a similar instance of sub-server software that can communicate through a secure channel to docks to issue a visa. All sub-servers store all communication policies. Each of the sub-servers also has a secure channel to other sub-servers, established through the SNN. The sub-servers use these secure channels to share the authentication status of agents' attributes using methods well known in the art.

In one variation of the second embodiment, to issue a visa in response to a visa request, the responding sub-server first generates the information in the visa and the information associated with the visa that requires endorsement. It sends that information, and any other information in the visa request, to other sub-servers over the secure channels. When each sub-server receives the information, it attempts to determine if such a visa and associated information is compliant with policy. If so, it provides an endorsement, for example by cryptographically signing the information that requires endorsement, using its private key, and returning the resulting signature to the responding sub-server. The responding sub-server then provides an endorsement of its own, for example by using its own signature in combination with the policy-required number, e.g. one, of additional sub-server signatures to endorse the visa and associated information, which it then issues. To issue a refusal in response to a visa request, the responding sub-server first sends the information to be included with the refusal, which may include information from the visa request, to the other sub-servers over the secure channels. When each sub-server receives this information, it attempts to determine if such a request should be rejected with the information included in the refusal. If so, it provides an endorsement, for example by cryptographically signing the information, using its private key, and returning the resulting signature to the responding sub-server. The responding sub-server then provides an endorsement of its own, for example by using its own signature in combination with the policy-required number, e.g. one, of additional sub-server signatures to endorse the information in the refusal. The responding sub-server then issues the refusal by sending the endorsed refusal to the requesting dock.

In a second variation of the second embodiment, each request is sent to three sub-servers, and the response is only accepted if two of the three sub-servers produce matched responses differing only in their endorsement. In this case, the requesting dock combines the endorsement from each of these matching responses to produce a fully endorsed visa and associated information.

Preferably, each dock's reliable, secure connection to the visa service includes reliable, secure connections to multiple sub-servers of the visa service. In this case, the dock sends its visa requests to one of the sub-servers of the service, and if it fails to receive a valid response, with a valid endorsement, within a certain period of time after the request, it may re-attempt the request by sending it to a different sub-server.

Preferably, the admin service is also implemented on multiple hardware units in a manner similar to the visa service. The sub-servers of the admin server also use the secure channels established between them to share state. In the case of the admin server, the requests are made by and the responses are sent to an admin rather than a dock, and the admin's reliable, secure channel to the admin service may include reliable, secure connections to multiple sub-servers of the admin service. The admin server may also send additional responses, based on the requests of the admin, to the hardware units and PPUs. The validity of these responses may be verified before they are accepted.

Either SNN service may also receive reports from PPUs or management services in the form of requests for acknowledgment of the reports. In the preferred embodiment, the PPUs' and management services' secure channels to the service include multiple reliable, secure connections to sub-servers of the service. The responses acknowledging reports are preferably endorsed by multiple sub-servers, using the methods described above. The endorsement of these responses may be checked for validity by the reporting PPU or management service. If the reporter does not receive a valid response to a report, the reporter may attempt to re-transmit the report to another sub-server.

SNS Devices

There are several types of devices that may be advantageously used to create an embodiment of a SNS. Such devices are referred to as SNS devices. SNS devices have interfaces such as network interfaces, including wired electrical or optical interfaces and wireless interfaces, and interaction interfaces, including keypads, card readers, microphones, audio speakers, speech understanding systems, cameras, displays, and face, fingerprint, voice, and other recognition systems. These devices may or may not incorporate processors with firmware, software, or other programmable elements. These devices may have firmware, addresses, and other network information required to establish secure channels through the interfaces stored in read-only memory. Alternatively, they may store this information in programmable read-only memory, in which case the device may have a method of programming that read-only memory that preferably requires physical access to the device and an access tool such as a physical key. A device implementing components of the SNN may also implement management services of the SNN.

One such SNS device is a hardware unit, called a dock device, that implements the functionality of a dock and enables ties-in to that dock through adaptor-facing interfaces that facilitate the use of wired or wireless connections for communicating with adaptors. A dock device also has SNN-facing interfaces that facilitate the use of wired or wireless connections for communicating with the internal communication system of a SNN. For example, each of these interfaces may be an Ethernet or Wi-Fi interface. A single interface may serve as both an adaptor-facing interface and a SNN-facing interface.

An optional addition to a dock device is the functionally of a forwarder linked to the dock by a link internal to the device. The forwarder may also have SNN-facing interfaces that facilitate communication with the internal communication system of a SNN.

Another SNS device is a hardware unit, called a forwarder device, that implements the functionality of a forwarder, with SNN-facing interfaces that facilitate the use of wired or wireless connections for communicating with the internal communication system of a SNN. For example, each of these interfaces may be an Ethernet or Wi-Fi interface.

Another optional addition to either a forwarder device or a dock device that includes the functionality of a forwarder is the functionality of a visa service or a component of a physically distributed visa service, including the functions of the internal dock, adaptor, and tie-in required for the visa service to communicate with a forwarder in the device.

Another optional addition to either a forwarder device or a dock device that includes the functionality of a forwarder is the functionality of an admin service or a component of a physically distributed admin service, including the functions of the internal dock, adaptor, and tie-in required for the admin service to communicate with a forwarder in the device. Such an addition may include an internal clock. It may also include an additional physical interface for the startup channel such as an Ethernet connection. Preferably the use of this physical interface requires an access tool or tools such as one or more physical keys.

Another SNS device is a hardware unit, called an adaptor device, that implements the functionality of an adaptor and enables tie-ins to a dock external to the device through dock-facing interfaces that facilitate the use of wired or wireless connections for communicating with docks. An adaptor device also has agent-facing interfaces that facilitate the use of wired or wireless connections or interaction interfaces for communicating with an agent or assisting in determining and authenticating the identity of an agent. For example, each of these interfaces may be an Ethernet, cellular, or Wi-Fi interface. A single interface may serve as both a dock-facing and an agent-facing interface.

An optional addition to an adaptor device is a bypass mechanism that identifies entering packets with specific characteristics, such as a destination address in a certain range, sends matching packets through the adaptor, and bypasses packets that do not. Such a bypass mechanism may also merge the packets that pass through the adaptor and those that bypass the adaptor onto a single packet stream. Such a bypass mechanism may be used for packets flowing between a dock-facing interface and an agent-facing interface to selectively bypass the adaptor.

Another optional addition to an adaptor device is a firewall that identifies and discards packets with specific characteristics.

Another optional addition to an adaptor device assists in determining and authenticating the identity attributes of an agent through interaction interfaces.

Another optional addition to an adaptor device communicates through interfaces to other devices to assist in determining and authenticating attributes of agents' identities.

Another optional addition to an adaptor device implements the functionality of a phone, video game, security camera, personal computer, or other type of appliance by communication through a SNN.

Another SNS device is a hardware unit, called a SNS native device, that implements the functionality of an adaptor, an internal dock, and a tie-in between them. In addition to the normal function of these components, a SNS native device implements the functionality of a phone, video game, security camera, personal computer, or other type of appliance by communication through a SNN. It includes SNN-facing interfaces that facilitate the use of wired or wireless connections for dock communication with the internal communications system of the SNN. Preferably, the admin of a SNS controls the configuration of a SNS native device that connects to a SNN administered by that admin.

Another optional addition to any SNS device assists the admin service in authenticating the device, such as secret internal information or a cryptographically signed certificate tied to the hardware serial number of the device.

Another optional addition to any SNS device proves a factor of the identity of an individual who has physical access to the device, such as a keypad, a card reader, a facial recognition system, or a fingerprint reader, as a condition of programming the device or use of one or more physical interfaces on the device.

An optional addition to any SNS device that includes the functionality of a forwarder is the functionality of additional forwarders, connected directly or indirectly to the first forwarder by internal links and communicating with SNN-facing interfaces.

An optional addition to any SNS device that includes the functionality of a dock or an adaptor is a method of authenticating agent communication through the device, such as secret internal information or a method of verifying the hardware serial number of a device, to facilitate agents proving that they are communicating through the device as an attribute of their identity.

Another optional addition to any SNS device determines the physical location of the device, such as a Global Positioning System (GPS) receiver. If the device includes the functionality of an adaptor, this allows the adaptor to provide the physical location as an identity attribute of agents communicating through the device. If it includes the functionality of a PPU this enables the device to enforce policies that depend on the location of the PPU. An alternate method of determining the physical location of a device is attempting local communication with other devices that are expected to be in the vicinity, for example, through Wi-Fi, Bluetooth, or Radio Frequency Identification (RFID). This method may be used with devices that are expected to be nearby for other reasons, or with devices hidden in the expected vicinity specifically for this purpose.

Exemplary Arrangements of SNS Devices

One skilled in the art will appreciate that the hardware units, including SNS devices, that implement the components of a SNS may be arranged to attain numerous and varied embodiments of the invention.

Figure 12:
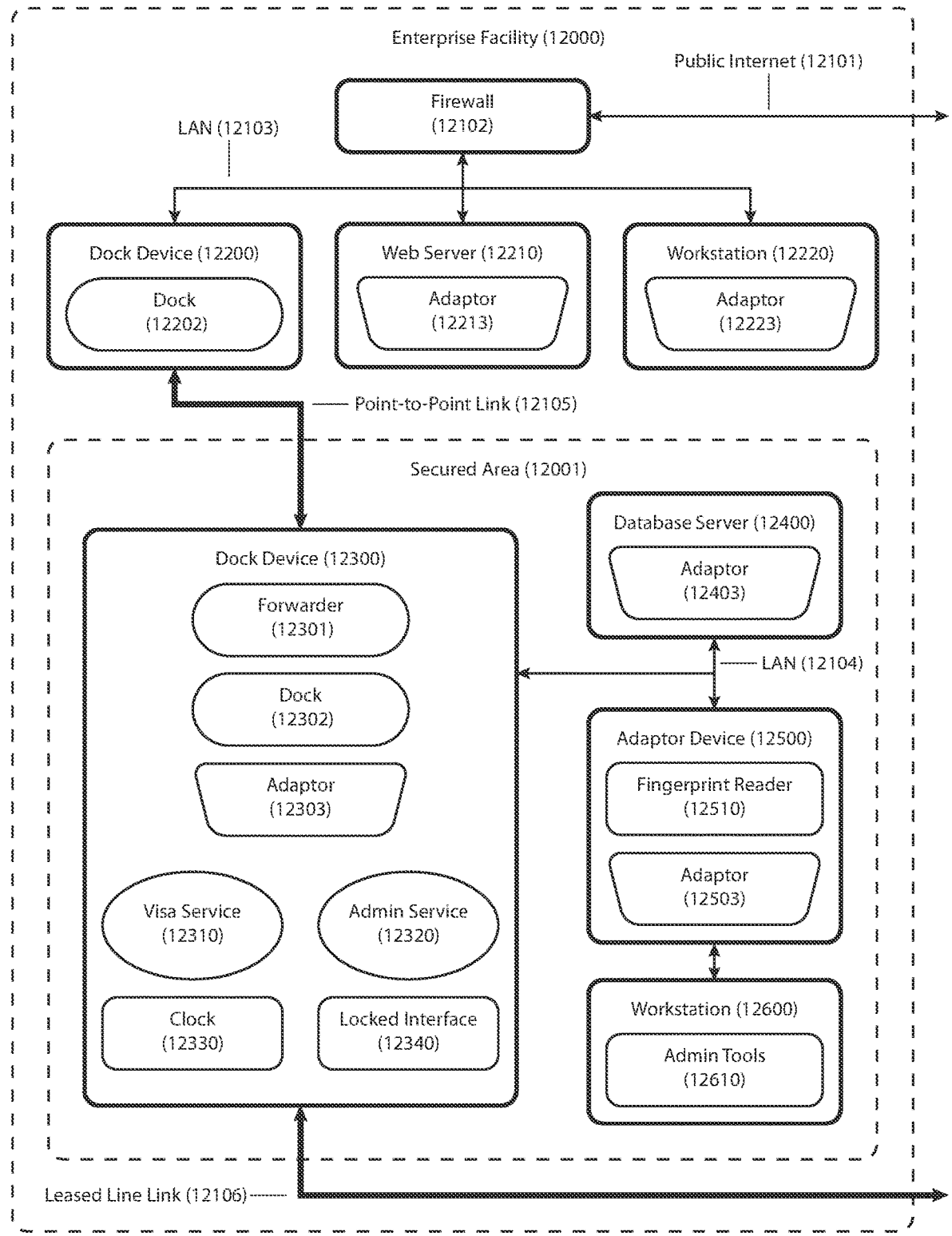
FIG. 12 shows an exemplary enterprise facility incorporating a SNS, in accordance with an embodiment of the present disclosure.

FIG. 12 shows an exemplary enterprise facility incorporating a SNS, in accordance with an embodiment of the present disclosure. The exemplary enterprise facility 12000 is connected to the public Internet 12101 through a conventional firewall 12102. A private local area network (LAN) 12103 within the facility is used to connect a workstation 12220 and a web server 12210 within the facility to the public Internet through the firewall.

The web server communicates both with the public Internet and with a protected database server 12400 inside a physically secure area 12001 within the enterprise facility. To communicate with the database server through the SNN of the SNS, the web server uses an adaptor 12213 loaded into its operating system to establish a tie-in (not shown) through the LAN to a dock 12202 within a dock device 12200. The dock communicates via a link 12105 over a point-to-point connection with a forwarder 12301 on another dock device 12300 within the secure area. The forwarder communicates via a link (not shown) with a dock 12302 on the dock device 12300. Finally, the dock 12302 communicates with the database server via a tie-in (not shown) established through the LAN 12104 between the dock and an adaptor 12403 loaded into the operating system of the database server. Using an adaptor 12223, the workstation communicates with the protected database server in a similar manner.

The dock device 12300 within the secure area also includes a visa service 12310, an admin service 12320 with a clock 12330, and an adaptor 12303 that allows the visa service and admin service to establish tie-ins with the dock 12302. The dock 12302 of the dock device within the secure room is used to communicate over the SNN with the database server 12400 and any other devices within the secure area. For example, using an adaptor 12503 on an adaptor device 12500, a workstation 12600 with the admin tools 12610 used by an admin establishes a tie-in (not shown) through the LAN 12104 to the dock 12302. The adaptor 12503 facilitates the use of a fingerprint reader 12510 on the adaptor device to acquire the fingerprint of the admin to authenticate the admin. The admin can also change the firmware of the dock device 12300 through a physically locked interface 12340 that is normally locked and unconnected.

The forwarder 12301 within the dock device 12300 is also linked to one or more forwarders in similar facilities throughout the enterprise through links over leased lines 12106. Because these leased-line links and the point-to-point link 12105 are the only paths of communication in and out of the secure area, all such communication is governed by the policies of the SNS.

Figure 13:
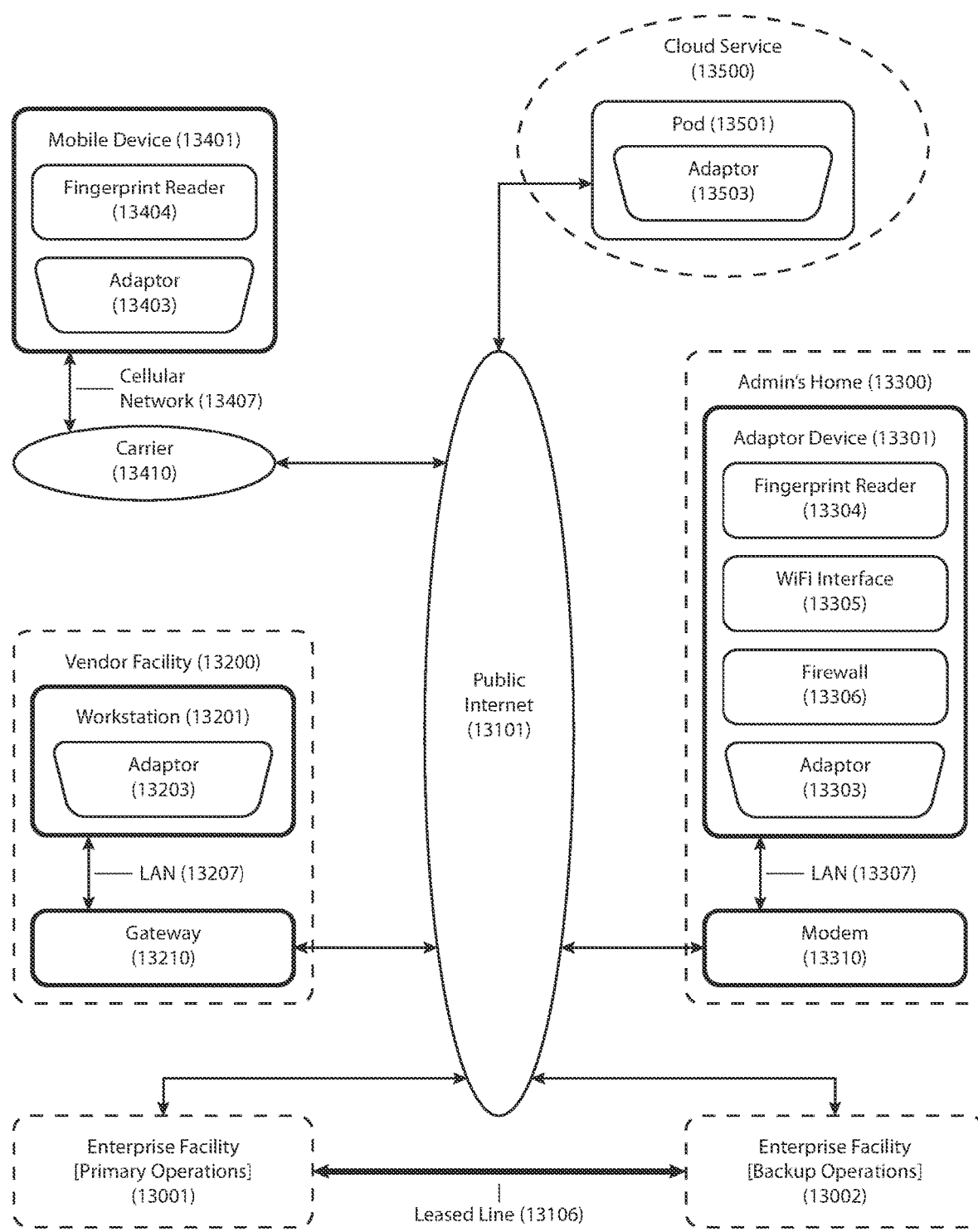
FIG. 13 shows two of the enterprise facilities of FIG. 12 using the SNS to communicate with each other and other enterprise resources, in accordance with an embodiment of the present disclosure.

FIG. 13 shows two of the enterprise facilities of FIG. 12 using the SNS to communicate with each other and other enterprise resources, in accordance with an embodiment of the present disclosure. Specifically, the enterprise facilities 13001 and 13002 communicate with one another via a leased line 13106. The enterprise facilities communicate with a vendor facility 13200, an admin's home 13300, a managed mobile device 13401, and a cloud-based service 13500 via the public Internet 13101.

Each of these other enterprise resources uses an adaptor to establish a tie-in to the dock 12202 of one or both of the enterprise facilities. The vendor facility includes a workstation 13201 with an adaptor 13203 that establishes the tie-in through a gateway 13210 to which it is connected via a LAN 13207. The admin's home includes an adaptor device 13301 with an adaptor 13303 that establishes the tie-in through a modem 13310 to which it is connected via a LAN 13307. The managed mobile device 13401 includes an adaptor 13403 that establishes the tie-in through a carrier 13410 to which it is connected via a cellular network 13407. The cloud service 13500 includes a pod 13501 of resources sharing an adaptor 13503 that establishes the tie-in directly through the public Internet. The adaptor device 13301 in the admin's home also includes a Wi-Fi interface 13305 and a firewall 13306 that facilitate communication with other devices within the home.

Finally, several of the other enterprise resources includes a mechanism for authentication. Specifically, the adaptor device 13301 at the admin's home 13300 and the managed mobile device 13401 include fingerprint readers 13304 and 13404 with which the respective adaptors 13303 and 13403 can facilitate agent authentication.

Example Processing System

Figure 14:
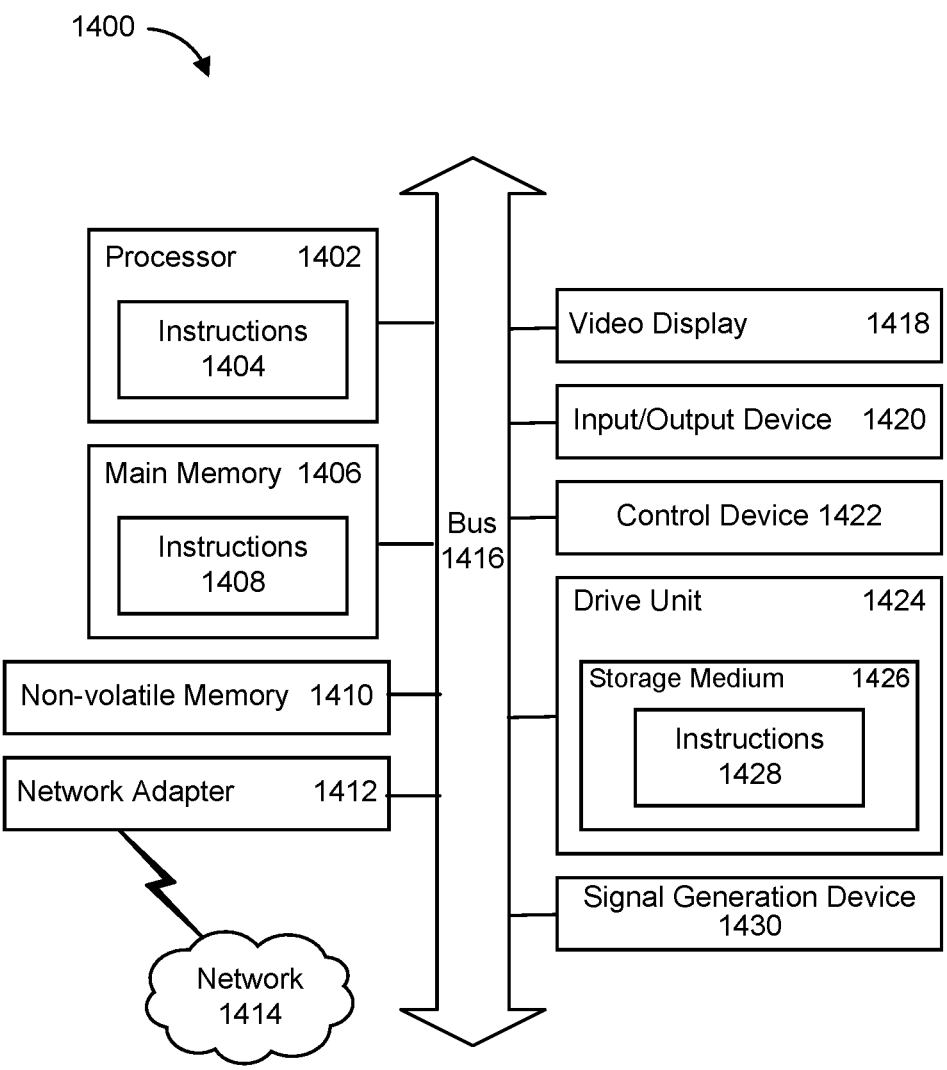
FIG. 14 is a block diagram illustrating an example of a processing system 1400 in which at least some operations described herein can be implemented.

FIG. 14 is a block diagram illustrating an example of a processing system 1400 in which at least some operations described herein can be implemented. In some embodiments of the invention, the hardware units described above may be implemented by processing systems similar to that shown in FIG. 14. As shown in FIG. 14, the processing system 1400 may include one or more central processing units ("processors") 1402, main memory 1406, non-volatile memory 1410, network adapter 1412, e.g., network interfaces, video display 1418, input/output devices 1420, control device 1422, e.g., keyboard and pointing devices, drive unit 1424 including a storage medium 1426, and signal generation device 1430 that are communicatively connected to a bus 1416. The bus 1416 is illustrated as an abstraction that represents any one or more separate physical buses, point-to-point connections, or both connected by appropriate bridges, adapters, or controllers. The bus 1416, therefore, can include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the processing system 1400 operates as part of a user device, although the processing system 1400 may also be connected, e.g. wired or wirelessly, to the user device. In a networked deployment, the processing system 1400 may operate in the capacity of a server or a client machine in a client-server network environment, or as a peer machine in a peer-to-peer (or distributed) network environment.

The processing system 1400 may be a server computer, a client computer, a personal computer, a tablet, a laptop computer, a personal digital assistant (PDA), a cellular phone, a processor, a web appliance, a network router, switch or bridge, a console, a hand-held console, a gaming device, a music player, network-connected ("smart") televisions, television-connected devices, or any portable device or machine capable of executing a set of instructions, sequential or otherwise, that specify actions to be taken by the processing system 1400.

While the main memory 1406, non-volatile memory 1410, and storage medium 1426 (also called a "machine-readable medium) are shown to be a single medium, the term "machine-readable medium" and "storage medium" should be taken to include a single medium or multiple media, e.g. a centralized or distributed database, and/or associated caches and servers, that store one or more sets of instructions 1428. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions, e.g., instructions 1404, 1408, 1428, set at various times in various memory and storage devices in a computer, and that, when read and executed by one or more processing units or processors 1402, cause the processing system 1400 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution. For example, the technology described herein could be implemented using virtual machines or cloud computing services.

Further examples of machine-readable storage media, machine-readable media, or computer-readable (storage) media include, but are not limited to, recordable type media such as volatile and non-volatile memory devices 1410; floppy and other removable disks; hard disk drives; optical disks, e.g. Compact Disk Read-Only Memory (CD ROMS), Digital Versatile Disks (DVDs); and transmission type media, such as digital and analog communication links.

The network adapter 1412 enables the processing system 1400 to mediate data in a network 1414 with an entity that is external to the processing system 1400 through any known and/or convenient communications protocol supported by the processing system 1400 and the external entity. The network adapter 1412 can include one or more of a network adapter card, a wireless network interface card, a router, an access point, a wireless router, a switch, a multilayer switch, a protocol converter, a gateway, a bridge, bridge router, a hub, a digital media receiver, and/or a repeater.

The network adapter 1412 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of communications and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here may be implemented by, for example, programmable circuitry, e.g. one or more microprocessors, programmed within software and/or firmware, implemented entirely in special-purpose hardwired circuitry, i.e. non-programmable circuitry, or in a combination of such forms. Special-purpose circuitry can be in the form of, for example, one or more application-specific integrated circuits (ASICs), programmable logic devices (PLDs), field-programmable gate arrays (FPGAs), etc.

From the foregoing, it will be appreciated that specific embodiments of the system have been described herein for purposes of illustration, but that various modifications may be made without deviating from the scope of the system. Accordingly, the system is not limited except as by the appended claims.

The invention claimed is:

1. A secure communication system enabling secure transport of information comprising:
    a secure network comprising one or more packet processing units (PPUs),
    wherein each PPU comprises one or more processors and a memory,
    a visa service issuing a plurality of visas, wherein said visa service is hosted on one or more servers, each of said plurality of visas associated with a compliant flow of said information from a first agent to a second agent through said secure network,
    a plurality of internal packets, comprising a first type of internal packets configured to transport said information, wherein one of said plurality of visas is associated with a first internal packet of said first type of internal packets upon a dock at which said first agent connects to said secure network converting a packet received from said first agent to said first internal packet, said first internal packet comprising a packet type field indicating the first type of internal packets, wherein a PPU among said one or more PPUs transmits an internal packet among said plurality of internal packets only if allowed by a visa associated with said internal packet.

2. The secure communication system of claim 1, wherein said compliant flow of said information is transmitted along a path through said secure network comprising two or more on-path PPUs among said PPUs.

3. The secure communication system of claim 2, wherein said visa is distributed to each of said on-path PPUs by said visa service via a secure channel.

4. The secure communication system of claim 3, wherein upon distributing said visa to each of said on-path PPUs, said visa service informs each of said on-path PPUs of a next on-path PPU along said path.

5. The secure communication system of claim 4, wherein each of said on-path PPUs stores a PPU identifier of said next on-path PPU in a forwarding table.

6. The secure communication system of claim 4, wherein each of said on-path PPUs and said next on-path PPU establish a visa identifier with which they may reference said visa.

7. The secure communication system of claim 6, wherein each of said on-path PPUs stores in a forwarding table an association between said visa identifier and a PPU identifier of said next on-path PPU.

8. The secure communication system of claim 6, wherein each of said on-path PPUs and said next on-path PPU establish said visa identifier via exchange of one or more of said internal packets.

9. The secure communication system of claim 6,
wherein said visa is associated with a visa serial number unique across said secure communication system at a point in time, and
wherein said each of said on-path PPUs and said next on-path PPU store an association between said visa serial number and said visa identifier.

10. The secure communication system of claim 2, wherein said plurality of internal packets comprises a second type of internal packets configured to distribute said plurality of visas, wherein said visa service issues said visa to a first on-path PPU among said on-path PPUs.

11. The secure communication system of claim 10, wherein said first on-path PPU is the dock at which said first agent connects to said secure network.

12. The secure communication system of claim 10,
wherein said first on-path PPU distributes said visa to a next on-path PPU via one or more of said second type of internal packets.

13. The secure communication system of claim 12,
wherein said visa is associated with a visa serial number unique across said secure communication system at a point in time, and
wherein said first on-path PPU and said next on-path PPU establish a visa identifier with which they may reference said visa, and
wherein said first on-path PPU and said next on-path PPU each store an association between said visa serial number and said visa identifier.

14. The secure communication system of claim 13,
wherein said next on-path PPU distributes said visa to an after-next on-path PPU,
wherein said next on-path PPU and said after-next on-path PPU establish a next visa identifier with which they may reference said visa,
wherein said after-next on-path PPU distributes said visa onward to another on-path PPU in a manner similar to said next on-path PPU.

15. The secure communication system of claim 10,
wherein said visa service informs said first on-path PPU of a next on-path PPU along said path, and
wherein said first on-path PPU distributes said visa to said next on-path PPU via one or more of said second type of internal packets.

16. The secure communication system of claim 15, wherein said first on-path PPU and said next on-path PPU establish a visa identifier with which they may reference said visa.

17. The secure communication system of claim 16,
wherein said visa is associated with a visa serial number unique across said secure communication system at a point in time, and
wherein said visa service stores an association between said visa serial number and said visa identifier.

18. The secure communication system of claim 16, wherein said first on-path PPU stores in a forwarding table an association between said visa identifier and a PPU identifier of said next on-path PPU.

19. The secure communication system of claim 16, wherein upon distribution of said visa from said first on-path PPU to said next on-path PPU, said next on-path PPU contacts said visa service.

20. The secure communication system of claim 19,
wherein said visa service informs said next on-path PPU of an after-next on-path PPU,
wherein said next on-path PPU distributes said visa to said after-next on-path PPU,
wherein said next on-path PPU and said after-next on-path PPU establish a next visa identifier with which they may reference said visa,
wherein said next on-path PPU stores in a forwarding table an association between said next visa identifier and a PPU identifier of said after-next on-path PPU.

* * * * *